US010343107B2

(12) United States Patent
Northrop et al.

(10) Patent No.: US 10,343,107 B2
(45) Date of Patent: Jul. 9, 2019

(54) SEPARATING CARBON DIOXIDE AND HYDROGEN SULFIDE FROM A NATURAL GAS STREAM USING CO-CURRENT CONTACTING SYSTEMS

(71) Applicants: Paul Scott Northrop, Spring, TX (US); Charles J. Mart, The Woodlands, TX (US); J. Tim Cullinane, Montgomery, TX (US)

(72) Inventors: Paul Scott Northrop, Spring, TX (US); Charles J. Mart, The Woodlands, TX (US); J. Tim Cullinane, Montgomery, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 15/433,168

(22) Filed: Feb. 15, 2017

(65) Prior Publication Data

US 2017/0157553 A1    Jun. 8, 2017

Related U.S. Application Data

(62) Division of application No. 14/268,432, filed on May 2, 2014, now abandoned.

(Continued)

(51) Int. Cl.
*B01D 45/16* (2006.01)
*B01D 53/14* (2006.01)

(Continued)

(52) U.S. Cl.
CPC ......... *B01D 53/1406* (2013.01); *B01D 45/16* (2013.01); *B01D 53/1425* (2013.01);
(Continued)

(58) Field of Classification Search
CPC ......... B01D 2251/606; B01D 2251/90; B01D 2255/804; B01D 53/346; B01D 53/62;
(Continued)

(56) References Cited

U.S. PATENT DOCUMENTS

| 1,951,647 A | 3/1934 | Cooke | 196/46 |
| 2,847,200 A | 8/1958 | Ung | 202/158 |

(Continued)

FOREIGN PATENT DOCUMENTS

| CA | 2144585 | 6/1996 | ............. B01D 53/52 |
| DE | 10162457 | 7/2003 | ............... B01D 3/32 |

(Continued)

OTHER PUBLICATIONS

Carter, T. et al. (1998) "Addition of Static Mixers Increases Treating Capacity in Central Texas Gas Plant," *Proceedings of the 77th GPA Ann. Conv.*, pp. 110-113.

(Continued)

*Primary Examiner* — Cabrena Holecek
(74) *Attorney, Agent, or Firm* — ExxonMobil Upstream Research Company—Law Department

(57) ABSTRACT

Systems and methods for separating $CO_2$ and $H_2S$ from a natural gas stream are provided herein. The system includes a first loop of co-current contacting systems configured to remove $H_2S$ and $CO_2$ from a natural gas stream and a second loop of co-current contacting systems configured to remove the $H_2S$ from the $CO_2$.

16 Claims, 15 Drawing Sheets

Related U.S. Application Data

(60) Provisional application No. 61/821,618, filed on May 9, 2013.

(51) Int. Cl.
| | | |
|---|---|---|
| *B01D 53/18* | (2006.01) | |
| *B01F 3/04* | (2006.01) | |
| *B01F 5/04* | (2006.01) | |
| *C01B 17/04* | (2006.01) | |
| *C01B 17/16* | (2006.01) | |
| *C10L 3/10* | (2006.01) | |
| *E21B 43/40* | (2006.01) | |
| *B01D 53/62* | (2006.01) | |
| *E21B 43/16* | (2006.01) | |
| *C01B 32/50* | (2017.01) | |

(52) U.S. Cl.
CPC ..... *B01D 53/1462* (2013.01); *B01D 53/1468* (2013.01); *B01D 53/18* (2013.01); *B01D 53/62* (2013.01); *B01F 3/04021* (2013.01); *B01F 5/0463* (2013.01); *C01B 17/0408* (2013.01); *C01B 17/167* (2013.01); *C01B 32/50* (2017.08); *C10L 3/101* (2013.01); *C10L 3/103* (2013.01); *C10L 3/104* (2013.01); *E21B 43/16* (2013.01); *E21B 43/40* (2013.01); *B01D 2252/20431* (2013.01); *B01D 2256/245* (2013.01); *B01D 2257/30* (2013.01); *B01D 2257/80* (2013.01); *C10L 2290/12* (2013.01); *C10L 2290/541* (2013.01); *E21B 43/164* (2013.01); *Y02C 10/04* (2013.01); *Y02C 10/06* (2013.01); *Y02P 20/152* (2015.11)

(58) Field of Classification Search
CPC ............... B01D 53/77; B01D 53/8671; B01D 2257/30; B01D 2257/304; B01D 2257/504; B01D 2257/80; B01D 53/14; B01D 53/1406; B01D 53/1456; B01D 53/18; B01D 53/00; B01D 53/1425; B01D 53/1475; B01F 3/04021; B01F 5/0413; B01F 5/0471; C12M 23/58; C12M 27/00; C12M 29/00; C12M 29/04; C12M 29/18; C12P 7/40; Y02C 10/04; Y02P 20/152; Y02P 20/59

See application file for complete search history.

(56) References Cited

U.S. PATENT DOCUMENTS

| | | | | |
|---|---|---|---|---|
| 3,767,766 | A | 10/1973 | Tjoa et al. ..................... 423/220 |
| 3,773,472 | A | 11/1973 | Hausberg et al. ............... 23/283 |
| 3,989,811 | A | 11/1976 | Hill ................................ 423/573 |
| 4,073,832 | A | 2/1978 | McGann ........................ 261/118 |
| 4,204,934 | A | 5/1980 | Warren et al. ................. 204/186 |
| 4,318,717 | A | 3/1982 | Sohier ............................... 55/71 |
| 4,369,167 | A | 1/1983 | Wier, Jr. ........................ 423/210 |
| 4,405,580 | A | 9/1983 | Stogryn et al. ................ 423/226 |
| 4,421,725 | A | 12/1983 | Dezael et al. ................. 423/228 |
| 4,589,896 | A | 5/1986 | Chen et al. ....................... 62/28 |
| 4,603,035 | A | 7/1986 | Connell et al. ................ 423/226 |
| 4,678,648 | A | 7/1987 | Wynn ............................ 423/226 |
| 4,701,188 | A | 10/1987 | Mims .............................. 55/20 |
| 4,752,307 | A | 6/1988 | Asmus et al. .................... 55/73 |
| 4,824,645 | A | 4/1989 | Jones et al. ................... 423/226 |
| 4,885,079 | A | 12/1989 | Eppig et al. ................... 208/13 |
| 5,067,971 | A | 11/1991 | Bikson et al. .................. 55/16 |
| 5,085,839 | A | 2/1992 | Scott et al. .................... 423/210 |
| 5,091,119 | A | 2/1992 | Biddulph et al. ........... 261/114.3 |
| 5,093,094 | A | 3/1992 | Van Kleek et al. ........... 423/224 |
| 5,186,836 | A | 2/1993 | Gauthier et al. ........... 210/512.1 |
| 5,209,821 | A | 5/1993 | Shaw et al. ................. 159/4.01 |
| 5,439,509 | A | 8/1995 | Spink et al. .................... 95/166 |
| 5,462,584 | A | 10/1995 | Gavlin et al. .................. 95/231 |
| 5,603,908 | A | 2/1997 | Yoshida et al. ................ 423/220 |
| 5,648,053 | A | 7/1997 | Mimura et al. ............... 423/210 |
| 5,664,426 | A | 9/1997 | Lu ..................................... 62/93 |
| 5,713,985 | A | 2/1998 | Hamilton .......................... 95/90 |
| 5,735,936 | A | 4/1998 | Minkkinen et al. ............. 95/49 |
| 5,810,897 | A * | 9/1998 | Konosu ................. B01D 47/06 55/418 |
| 5,837,105 | A | 11/1998 | Stober et al. .................... 203/40 |
| 5,907,924 | A | 6/1999 | Collin et al. ..................... 45/194 |
| 5,988,283 | A | 11/1999 | Gann ............................. 166/357 |
| 6,063,163 | A | 5/2000 | Carmody ........................ 95/187 |
| 6,071,484 | A | 6/2000 | Dingman et al. ............. 423/229 |
| 6,089,317 | A | 7/2000 | Shaw ............................. 166/265 |
| 6,214,097 | B1 | 4/2001 | Laslo ............................... 96/236 |
| 6,228,145 | B1 | 5/2001 | Falk-Pedersen et al. ......... 95/44 |
| 6,284,023 | B1 | 9/2001 | Torkildsen et al. ............. 95/216 |
| 6,830,608 | B1 | 12/2004 | Peters ........................... 261/112 |
| 6,881,389 | B2 | 4/2005 | Paulsen et al. ................ 423/210 |
| 7,018,451 | B1 | 3/2006 | Torkeldsen et al. ............. 95/216 |
| 7,128,276 | B2 | 10/2006 | Nilsen et al. ................. 236/124 |
| 7,144,568 | B2 | 12/2006 | Ricard et al. .................. 423/659 |
| 7,152,431 | B2 | 12/2006 | Amin et al. ..................... 62/637 |
| 7,175,830 | B2 | 2/2007 | Minkkinen et al. ........... 423/228 |
| RE39,826 | E | 9/2007 | Lu ................................... 62/632 |
| 7,273,513 | B2 | 9/2007 | Linga et al. ..................... 95/235 |
| 7,560,088 | B2 | 7/2009 | Keller et al. ................. 423/537.1 |
| 7,811,343 | B2 | 10/2010 | Toma .............................. 55/318 |
| 8,071,046 | B2 | 12/2011 | Hassan et al. ................. 422/225 |
| 8,137,444 | B2 | 3/2012 | Farsad et al. ................... 96/235 |
| 8,240,640 | B2 | 8/2012 | Nakayama ..................... 261/109 |
| 8,268,049 | B2 | 9/2012 | Davydov ........................ 95/199 |
| 8,336,863 | B2 | 12/2012 | Neumann et al. ............. 261/115 |
| 8,343,360 | B2 | 1/2013 | Schook .......................... 210/788 |
| 8,454,727 | B2 | 6/2013 | Dunne et al. .................... 95/51 |
| 8,475,555 | B2 | 7/2013 | Betting et al. .................. 55/416 |
| 8,652,237 | B2 | 2/2014 | Heldebrant et al. ............. 95/235 |
| 8,741,127 | B2 | 6/2014 | Koseoglu et al. ............... 20/57 |
| 8,900,347 | B2 | 12/2014 | Boulet et al. ................... 95/114 |
| 9,192,896 | B2 | 11/2015 | Hassan et al. ......... B01F 7/00766 |
| 9,238,193 | B2 | 1/2016 | Ji et al. ............... B01D 53/1468 |
| 9,295,953 | B2 | 3/2016 | Linga et al. ................. 366/167.2 |
| 9,353,315 | B2 | 5/2016 | Heath et al. ............... C10G 5/06 |
| 9,599,070 | B2 | 3/2017 | Huntington et al. ............. 60/39 |
| 9,764,252 | B2 | 9/2017 | Whitney et al. .... B01D 17/0217 |
| 9,902,914 | B2 | 2/2018 | Mak ........................ C10L 3/104 |
| 2001/0037876 | A1 | 11/2001 | Oost et al. ..................... 165/133 |
| 2003/0005823 | A1 | 1/2003 | LeBlanc et al. ................. 95/149 |
| 2003/0155438 | A1 | 8/2003 | Boee et al. ................... 239/533.2 |
| 2004/0092774 | A1 | 5/2004 | Mimura .......................... 564/497 |
| 2005/0006086 | A1 | 1/2005 | Gramme ...................... 166/105.5 |
| 2006/0123993 | A1 | 6/2006 | Henriksen ....................... 96/234 |
| 2006/0185320 | A1 | 8/2006 | Dureiko .......................... 52/749 |
| 2007/0205523 | A1 | 9/2007 | Kojima ......................... 261/79.2 |
| 2008/0006011 | A1 | 1/2008 | Larnholm et al. .............. 55/421 |
| 2008/0107581 | A1 | 5/2008 | Sparling et al. ............... 423/222 |
| 2008/0115532 | A1 | 5/2008 | Jager ............................... 62/620 |
| 2008/0190291 | A1 | 8/2008 | Krehbiel et al. ................ 95/241 |
| 2008/0257788 | A1 | 10/2008 | Leito et al. ..................... 209/44 |
| 2008/0290021 | A1 | 11/2008 | Buijs et al. ................. 210/500.27 |
| 2009/0213687 | A1 | 8/2009 | Linga et al. ................. 366/167.2 |
| 2009/0241778 | A1 | 10/2009 | Lechnick et al. ............... 95/177 |
| 2010/0229725 | A1 | 9/2010 | Farsad et al. .................... 96/74 |
| 2011/0036122 | A1 | 2/2011 | Betting et al. .................. 62/636 |
| 2011/0168019 | A1* | 7/2011 | Northrop ........... B01D 53/1406 95/186 |
| 2011/0185633 | A1 | 8/2011 | Betting et al. ................ 48/127.5 |
| 2011/0217218 | A1 | 9/2011 | Gupta et al. ................... 423/228 |
| 2011/0296869 | A1 | 12/2011 | Buhrman et al. ............... 62/617 |
| 2012/0060691 | A1 | 3/2012 | Bieri et al. ...................... 95/270 |
| 2012/0204599 | A1 | 8/2012 | Northrop et al. ............... 62/617 |
| 2012/0238793 | A1 | 9/2012 | Cullinane et al. ............. 585/833 |
| 2012/0240617 | A1 | 9/2012 | Weiss et al. .................... 62/611 |
| 2012/0279728 | A1 | 11/2012 | Northrop et al. ............. 166/401 |
| 2013/0017144 | A1 | 1/2013 | Menzel .......................... 423/542 |
| 2014/0033921 | A1 | 2/2014 | Peck et al. ...................... 95/269 |
| 2014/0123851 | A1 | 5/2014 | Jamtvedt et al. ............... 95/149 |
| 2014/0245889 | A1 | 9/2014 | Hamre et al. ................... 95/223 |

(56) References Cited

U.S. PATENT DOCUMENTS

| | | | |
|---|---|---|---|
| 2014/0331862 A1 | 11/2014 | Cullinane et al. | 95/186 |
| 2014/0335002 A1 | 11/2014 | Northrop et al. | 423/228 |
| 2014/0366446 A1 | 12/2014 | Sharma et al. | 48/127.3 |
| 2014/0373714 A1 | 12/2014 | Cloud et al. | 95/273 |
| 2015/0013539 A1 | 1/2015 | Eriksen et al. | 95/172 |
| 2015/0083425 A1 | 3/2015 | Sullivan et al. | |
| 2015/0135954 A1 | 5/2015 | Li et al. | |
| 2015/0191360 A1 | 7/2015 | Weiss et al. | C01B 31/20 |
| 2015/0267871 A1 | 9/2015 | Murray, Sr. et al. | F17D 3/01 |
| 2015/0322580 A1 | 11/2015 | Little | 205/554 |
| 2015/0352463 A1* | 12/2015 | Grave | B01D 53/185 203/14 |
| 2016/0060190 A1 | 3/2016 | Trucko et al. | C07C 7/005 |
| 2016/0136569 A1 | 5/2016 | Lee et al. | B01D 53/18 |
| 2016/0199774 A1 | 7/2016 | Grave et al. | 95/235 |
| 2016/0236140 A1 | 8/2016 | Northrop et al. | 95/210 |
| 2016/0263516 A1 | 9/2016 | Freeman et al. | 423/226 |
| 2016/0288045 A1 | 10/2016 | Kramer et al. | B01D 53/1493 |
| 2017/0145803 A1 | 5/2017 | Yeh et al. | E21B 43/36 |
| 2017/0157553 A1 | 6/2017 | Northrop et al. | 96/314 |
| 2017/0184021 A1 | 6/2017 | Huntington et al. | F02C 3/34 |
| 2017/0239612 A1 | 8/2017 | Mondkar et al. | 423/220 |
| 2018/0071674 A1 | 3/2018 | Freeman et al. | 423/228 |
| 2018/0361307 A1 | 12/2018 | Yeh et al. | B01D 53/1406 |
| 2018/0361309 A1 | 12/2018 | Yeh et al. | B01D 53/185 |
| 2018/0362858 A1 | 12/2018 | Ramkumar et al. | C10G 25/003 |

FOREIGN PATENT DOCUMENTS

| | | | |
|---|---|---|---|
| EP | 0191985 | 8/1986 | B01D 53/18 |
| EP | 0301623 | 1/1989 | B01D 53/14 |
| EP | 1021237 | 3/1999 | B01D 53/18 |
| EP | 1438484 | 4/2003 | B01D 17/02 |
| EP | 1141520 | 5/2003 | E21B 43/40 |
| EP | 1340536 | 9/2003 | B01J 19/30 |
| EP | 2134446 | 9/2015 | B01D 54/04 |
| GB | 1234862 | 6/1971 | B01D 53/18 |
| GB | 1377026 | 12/1974 | B01D 47/10 |
| GB | 1579249 | 11/1980 | H01J 1/13 |
| GB | 2079177 | 1/1982 | B01D 53/18 |
| GB | 2094951 | 9/1982 | F22B 3/04 |
| GB | 2414688 | 12/2006 | B01D 53/26 |
| JP | 48-066073 | 9/1971 | B01D 47/10 |
| JP | 53-032109 | 3/1978 | A61K 9/08 |
| JP | 06-170153 | 12/1992 | B01D 53/34 |
| JP | 2014-000500 | 1/2014 | B01D 53/14 |
| WO | WO1993/010883 | 6/1993 | B01D 53/14 |
| WO | WO1997/046304 | 12/1997 | B01D 53/26 |
| WO | WO1999/013966 | 3/1999 | B01D 53/18 |
| WO | WO2000/056844 | 9/2000 | C10L 3/10 |
| WO | WO2002/032536 | 4/2002 | B01D 17/00 |
| WO | WO2003/072226 | 9/2003 | B01D 53/14 |
| WO | W2004/070297 | 8/2004 | F25J 3/06 |
| WO | WO2006/038810 | 4/2006 | B01F 5/04 |
| WO | WO2009/140993 | 11/2009 | B01D 45/16 |
| WO | WO2013/136310 | 9/2013 | B01D 53/14 |
| WO | WO2014/042529 | 3/2014 | |
| WO | WO2014/094794 | 6/2014 | B01D 17/04 |
| WO | WO2014/106770 | 7/2014 | |
| WO | WO2015/013539 | 1/2015 | H04W 52/36 |
| WO | WO2015/105438 | 7/2015 | B01D 53/14 |
| WO | WO2015/167404 | 11/2015 | B01D 53/22 |
| WO | WO2016/064825 | 4/2016 | B01D 53/48 |

OTHER PUBLICATIONS

Garrison, J. et al. (2002) "Keyspan Energy Canada Rimbey Acid Gas Enrichment with FLEXSORBE SE Plus Technology," *Proceedings of the 2002 Laurance Reid Gas Conditioning Conf.*, Norman, OK, 8 pgs.

Hanna, James J. (2009) "Qatargas Expansion Projects: Why Change the Gas Treating Concept from Sulfinol-D?," *OSGAT 2009, Proceedings of the 5$^{th}$ Int'l Conf.*, Mar. 31-Apr. 1, 2009, Abu Dhabi, UAE, 33 pgs.

Jones, S. G. et al. (2004) "Design, Cost & Operation of an Acid Gas Enrichment & Injection Facility," *Proceedings of the 2004 Laurance Reid Gas Conditioning Conf.*, Norman, OK, 43 pgs.

Linga, H. et al. (2001) "New Selective $H_2S$ Removal Process for the Refining Industry," *Nat'l Petrochemical & Refiners Assoc.*, AM-01-35, 9 pgs.

Linga, H. et al. (2006) "Potentials & Applications for the ProPure Co-Current Contactors," *13$^{th}$ Annual India Oil & Gas Rev. Symp.*, Mumbai, India, 24 pgs.

Nilsen, F. et al. (2001) "Selective $H_2S$ Removal in 50 Milliseconds," *Gas Processors Assoc. Europe Ann. Conf.*, 12 pgs.

Nilsen, F. et al. (2002) "Novel Contacting Technology Selectively Removes $H_2S$," *Oil & Gas Journal*, 17 pgs.

Nilsen, F. et al. (2002) "Selective $H_2S$ Removal Applications using Novel Contacting Technology," *Gas Processors Assoc.*, 13 pgs.

Royan, T. et al. (1992) "Acid Gas Enrichment using FLEXSORB," *Proceedings of the 1992 Laurance Reid Gas Conditioning Conf.*, Norman, OK, Mar. 2-4, 1992, 17 pgs.

ProSep Inc. (2007) "Selective $H_2S$ Removal with Amines (ProCap)," *Product Brochure*, 32 pgs.

ProSep Inc. (2014) "ProDry," *Gas Portfolio Product Brochure*, 1 pg.

ProSep Inc. (2014) "ProScav," *Gas Portfolio Product Brochure*, 1 pg.

Schutte & Koerting (2012) "Gas Scrubbers," *Product Brochure*, 14 pgs.

True, Warren R. (1994) "New Mobile Bay Complex Exploits Major Sour Gas Reserve," *Oil & Gas Journal*, v. 92, No. 21, 4 pgs.

Weiland, R. H. (2008) "Acid Gas Enrichment—Maximizing Selectivity," *Proceedings of the 2008 Laurence Reid Gas Conditioning Conf.*, Clarita, OK, 16 pgs.

U.S. Appl. No. 62/548,171, filed Aug. 21, 2017, Denton, Robert D. et al.

U.S. Appl. No. 62/548,172, filed Aug 21, 2017, Denton, Robert D. et al.

Dow Chemical Company (Mar. 3, 2015) "Product Safety Assessment," *Selexol Solvents Product Brochure*, 3 pages.

Nova Molecular Technologies, Inc. (Jul. 17, 2008) "Product Brochure," *Flexsorb SE*, 1 page.

Puukilainen, E. et al. (2007) "Superhydrophobic Polyolefin Surfaces: Controlled Micro- an Nanostructures," *Dept. Of Chemistry, Univ. of Joensuu, Langmuir*, v. 23, No. 13, pp. 7263-7268.

Smith, W. B. (2010) "Typical Amine and Glycol Treating Unit Compared to Gas Membrane Separation System for Wellhead $CO_2$ Trimming," *Laurance Reid Gas Conditioning Conf.*, Norman, Ok, Feb. 21-24, 2010, pp. 417-436.

\* cited by examiner

700

800

800

800

800

SEPARATING CARBON DIOXIDE AND HYDROGEN SULFIDE FROM A NATURAL GAS STREAM USING CO-CURRENT CONTACTING SYSTEMS

CROSS-REFERENCE TO RELATED APPLICATION

This application is a divisional of the U.S. patent application Ser. No. 14/268,432 that published as US2014/0335002 and was filed on May 2, 2014, which claims the benefit of and priority from U.S. Provisional Application No. 61/821,618 filed on May 9, 2013 entitled SEPARATING CARBON DIOXIDE AND HYDROGEN SULFIDE FROM A NATURAL GAS STREAM USING CO-CURRENT CONTACTING SYSTEMS, the entirety of which is each of said applications being incorporated by reference, in its entirety, for all purposes.

FIELD OF THE INVENTION

The present techniques provide for the separation of carbon dioxide ($CO_2$) and hydrogen sulfide ($H_2S$) from a natural gas stream using co-current contacting systems. More specifically, the present techniques provide for the separation of $CO_2$ and $H_2S$ from a natural gas stream, as well as the separation of the $CO_2$ from the $H_2S$, using a series of co-current contacting systems.

BACKGROUND

This section is intended to introduce various aspects of the art, which may be associated with exemplary embodiments of the present techniques. This description is believed to assist in providing a framework to facilitate a better understanding of particular aspects of the present techniques. Accordingly, it should be understood that this section should be read in this light, and not necessarily as admissions of prior art.

The production of hydrocarbons from a reservoir oftentimes carries with it the incidental production of non-hydrocarbon gases. Such gases include contaminants such as hydrogen sulfide ($H_2S$) and carbon dioxide ($CO_2$). When $H_2S$ or $CO_2$ are produced as part of a hydrocarbon gas stream, such as methane or ethane, the raw natural gas is sometimes referred to as a "sour" natural gas. The $H_2S$ and $CO_2$ are often referred to together as "acid gases."

Sour natural gas must be treated to remove the $H_2S$ and $CO_2$ before it can be used as an environmentally-acceptable fuel. As an example, for LNG, the $H_2S$ and $CO_2$ must be removed to very low levels, e.g., less than about 50 parts per million by volume (ppmv) $CO_2$ and less than about 4 ppmv $H_2S$. As another example, for pipeline gas, the $H_2S$ must be removed to a very low level, e.g., less than about 4 ppmv, while the $CO_2$ may be removed to a lesser extent.

Cryogenic gas processes are sometimes used to remove $CO_2$ from raw natural gas stream to prevent line freezing and orifice plugging. In addition, particularly with $H_2S$ removal, the hydrocarbon fluid stream may be treated with a solvent. Solvents may include chemical solvents such as amines. Examples of amines used in sour gas treatment include monoethanol amine (MEA), diethanol amine (DEA), and methyl diethanol amine (MDEA).

Physical solvents are sometimes used in lieu of amine solvents. Examples include Selexol® and Rectisol™. In some instances, hybrid solvents, meaning mixtures of physical and chemical solvents, have been used. An example is Sulfinol®. In addition, the use of amine-based acid gas removal solvents is common.

Amine-based solvents rely on a chemical reaction with the acid gases. The reaction process is sometimes referred to as "gas sweetening." Such chemical reactions are generally more effective than the physical-based solvents, particularly at feed gas pressures below about 300 psia (2.07 MPa). There are instances where special chemical solvents such as Flexsorb™ are used, particularly for selectively removing $H_2S$ from $CO_2$-containing gas streams.

As a result of the gas sweetening process, a treated or "sweetened" gas stream is created. The sweetened gas stream is substantially depleted of $H_2S$ and $CO_2$. The sweetened gas stream can be further processed for liquids recovery, that is, by condensing out heavier hydrocarbon gases. The sweetened gas stream may be sold into a pipeline or may be used for liquefied natural gas (LNG) feed if the concentrations of $H_2S$ and $CO_2$ are low enough. In addition, the sweetened gas stream may be used as feedstock for a gas-to-liquids process, and then ultimately used to make waxes, butanes, lubricants, glycols, or other petroleum-based products.

Known counter-current contactors used for removing $H_2S$ and $CO_2$ from natural gas streams tend to be large and very heavy. This creates particular difficulty in offshore oil and gas production applications, where smaller equipment is desirable. Further, the transport and set-up of large tower-based facilities is difficult for shale gas production operations that frequently take place in remote locations.

The removal of $H_2S$ and $CO_2$ from a natural gas stream produces a rich solvent including the $H_2S$ and $CO_2$. The rich solvent is sometimes referred to as an absorbent liquid. Following removal of the $H_2S$ and $CO_2$, a process of regeneration (also called "desorption") may be employed to separate the $H_2S$ and $CO_2$ from the active solvent of the absorbent liquid. This produces a lean solvent.

Regeneration of the lean solvent generates a concentrated mixture of the $H_2S$ and $CO_2$, typically at around 15 psig. In some cases, this mixture can be sent to a Claus sulfur recovery unit to convert the $H_2S$ to elemental sulfur. However, in many cases, the high ratio of $CO_2$ to $H_2S$ renders the mixture unsuitable for use as a Claus feed stream. In such cases, the acid gas must be enriched prior to being used as a Claus feed stream. This may be accomplished via a low pressure enrichment process that uses a selective amine to preferentially absorb $H_2S$. In principle, the remaining gas in this case could be used as a substantially clean (although low pressure) $CO_2$ stream.

Alternatively, a "super-selective" $H_2S$ removal process may be used on a sour gas stream to remove substantially all of the $H_2S$, and to generate a concentrated acid gas stream suitable for Claus feed. This would obviate the need for an acid gas enrichment (AGE) unit, saving substantial costs. A subsequent $CO_2$ removal process could be used to generate a substantially clean $CO_2$ stream, as well as sweetened natural gas. The extracted $CO_2$ may then be sold, or it may be injected into a subterranean reservoir for enhanced oil recovery (EOR) operations.

U.S. Patent Application Publication No. 2009/0241778 by Lechnick et al. describes a system for removing $CO_2$ from a feed gas within an absorber unit that contains a solvent, and regenerating the solvent within an eductor. However, because the absorber unit and eductor are likely to be large and very heavy, such a system may be expensive and undesirable, particularly for offshore oil and gas recovery applications.

SUMMARY

An exemplary embodiment provides a system for separating $CO_2$ and $H_2S$ from a natural gas stream. The system includes a first loop of co-current contacting systems configured to remove $H_2S$ and $CO_2$ from a natural gas stream, and a second loop of co-current contacting systems configured to remove the $H_2S$ from the $CO_2$.

An exemplary embodiment provides a method for separating $CO_2$ and $H_2S$ from a natural gas stream. The method includes contacting a sour natural gas stream including $CO_2$ and $H_2S$ with a lean solvent stream within a first series of co-current contacting systems, generating a sweetened natural gas stream and a rich solvent stream including the $CO_2$ and the $H_2S$. The method includes contacting the rich solvent stream with a stripping gas within a second series of co-current contacting systems, regenerating the lean solvent stream and generating a first gas stream including the $CO_2$, the $H_2S$, and the stripping gas, and recirculating the lean solvent stream to the first series of co-current contacting systems. The method also includes contacting the first gas stream with a lean $H_2S$-selective solvent stream within a third series of co-current contacting systems, generating a rich $H_2S$-selective solvent stream including the $H_2S$ and a second gas stream including the $CO_2$ and the stripping gas. The method further includes contacting the rich $H_2S$-selective solvent stream with a stripping gas within a fourth series of co-current contacting systems, regenerating the lean $H_2S$-selective solvent stream and generating a third gas stream including the $H_2S$ and the stripping gas, and recirculating the lean $H_2S$-selective solvent stream to the third series of co-current contacting systems.

Another exemplary embodiment provides a system for separating $CO_2$ and $H_2S$ from a natural gas stream. The system includes a first series of co-current contacting systems configured to contact a sour natural gas stream including $CO_2$ and $H_2S$ with a lean solvent stream to generate a sweetened natural gas stream and a rich solvent stream including the $CO_2$ and the $H_2S$. The system includes a second series of co-current contacting systems configured to contact the rich solvent stream with a stripping gas to regenerate the lean solvent stream and generate a first gas stream including the $CO_2$, the $H_2S$, and the stripping gas, wherein the lean solvent stream is recirculated to the first series of co-current contacting systems. The system also includes a third series of co-current contacting systems configured to contact the first gas stream with a lean $H_2S$-selective solvent stream to generate a rich $H_2S$-selective solvent stream including the $H_2S$ and a second gas stream including the $CO_2$ and the stripping gas. The system further includes a fourth series of co-current contacting systems configured to contact the rich $H_2S$-selective solvent stream with a stripping gas to regenerate the lean $H_2S$-selective solvent stream and generate a third gas stream including the $H_2S$ and the stripping gas, wherein the lean $H_2S$-selective solvent stream is recirculated to the third series of co-current contacting systems.

Another exemplary embodiment provides a method for selectively removing one gaseous component from a multi-component gas stream. The method includes flowing a lean solvent stream into a mixer of a co-current contactor via an annular support ring and a number of radial blades extending from the annular support ring, wherein the annular support ring secures the mixer in-line within a pipe. The method also includes flowing a multi-component gas stream including a first gaseous component and a second gaseous component into the mixer via a central gas entry cone that is supported by the radial blades, wherein a first portion of the multi-component gas stream flows through the central gas entry cone and a second portion of the multi-component gas stream flows around the central gas entry cone between the plurality of radial blades. The method also includes contacting the multi-component gas stream with the lean solvent stream within the mixer and a mass transfer section of the co-current contactor to provide for incorporation of liquid droplets formed from the lean solvent stream into the multi-component gas stream, wherein the liquid droplets include the first gaseous component from the multi-component gas stream. The method further includes separating the liquid droplets from the multi-component gas stream within a separation system, generating a rich solvent stream including the first gaseous component and a gas stream including the second gaseous component.

BRIEF DESCRIPTION OF THE DRAWINGS

The advantages of the present techniques are better understood by referring to the following detailed description and the attached drawings, in which:

FIGS. 2B-1 and 2B-2 are a process flow diagram of an exemplary embodiment of the system of FIG. 2A;

DETAILED DESCRIPTION

Figure 1:
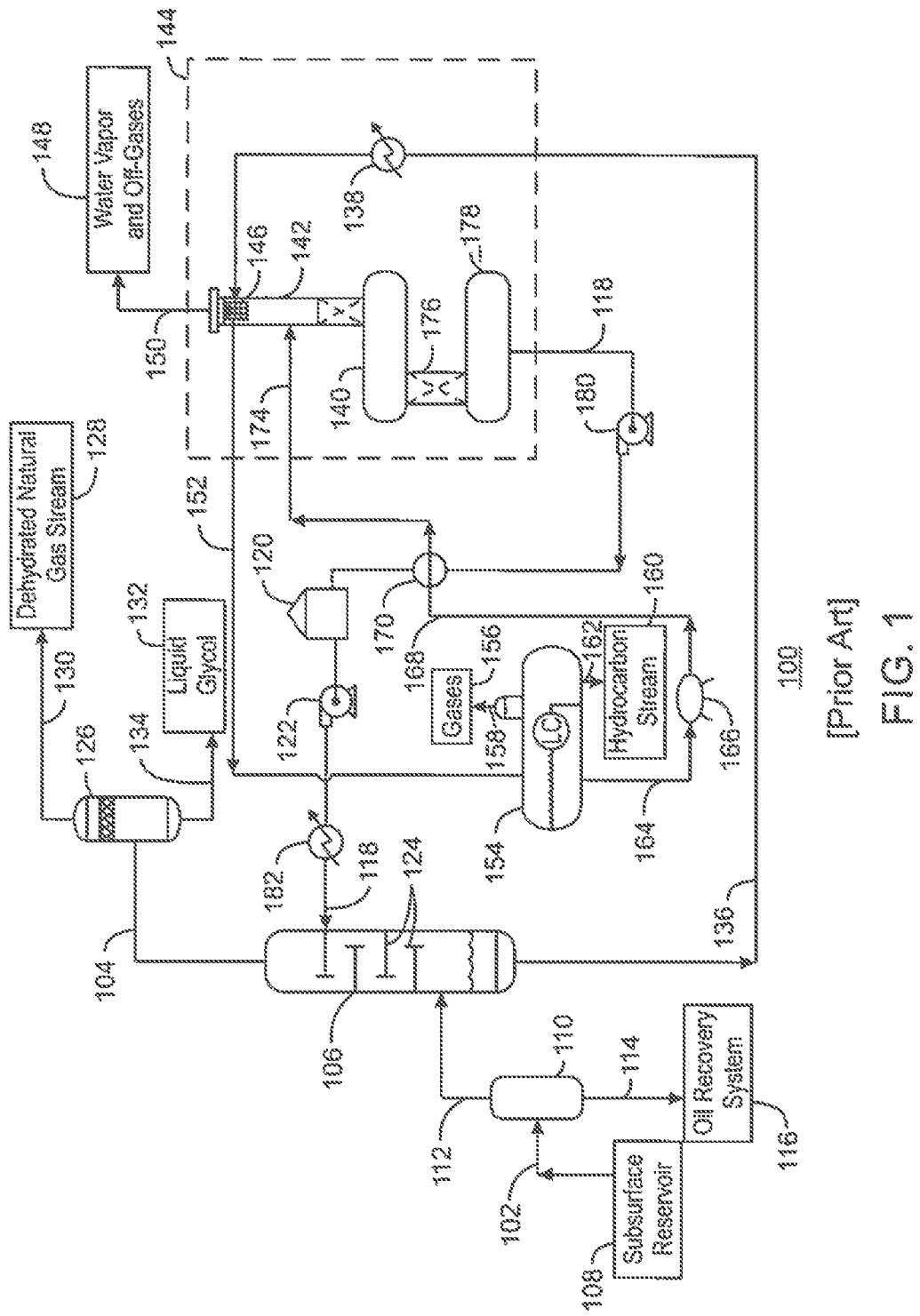
FIG. 1 is a process flow diagram of a chemical solvent-based gas processing system.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Acid gas" refers to any gas that produces an acidic solution when dissolved in water. Non-limiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof.

"Co-current contactor" refers to a vessel that receives a gas stream and a separate solvent stream in such a manner that the gas stream and the solvent stream contact one another while flowing in generally the same direction. Non-limiting examples include an eductor and a coalescer, or a static mixer plus deliquidizer.

The term "co-currently" refers to the internal arrangement of process streams within a unit operation that can be divided into several sub-sections by which the process streams flow in the same direction.

As used herein, a "column" is a separation vessel in which a counter-current flow is used to isolate materials on the basis of differing properties. In an absorbent column, a liquid solvent is injected into the top, while a mixture of gases to be separated is flowed into the bottom. As the gases flow upwards through the falling stream of absorbent, one gas species is preferentially absorbed, lowering its concentration in the vapor stream exiting the top of the column, while rich liquid is withdrawn from the bottom.

In a distillation column, liquid and vapor phases are counter-currently contacted to effect separation of a fluid mixture based on boiling points or vapor pressure differences. The high vapor pressure, or lower boiling, component will tend to concentrate in the vapor phase, whereas the low vapor pressure, or higher boiling, component will tend to concentrate in the liquid phase. Cryogenic separation is a separation process carried out in a column at least in part at temperatures at or below 150 degrees Kelvin (K). To enhance the separation, both types of columns may use a series of vertically spaced trays or plates mounted within the column and/or packing elements such as structured or random packing. Columns may often have a recirculated stream at the base to provide heat energy for boiling the fluids, which is generally referred to as "reboiling." Further, a portion of the overhead vapor may be condensed and pumped back into the top of the column as a reflux stream, which can be used to enhance the separation and purity of the overhead product. A bulk liquid stripper is related to a column. However, the bulk liquid stripper functions without the use of a reflux stream and, thus, cannot produce a high-purity overhead product.

"Dehydrated gas stream" refers to a natural gas stream that has undergone a dehydration process. Typically the dehydrated gas stream has a water content of less than 50 ppm, and preferably less than 7 ppm. Any suitable process for dehydrating the natural gas stream can be used. Typical examples of suitable dehydration processes can include, but are not limited to, treatment of the natural gas stream with molecular sieves or dehydration using glycol or methanol. Alternatively, the natural gas stream can be dehydrated by formation of methane hydrates; for example, using a dehydration process as described in WO 2004/070297.

As used herein, the term "dehydration" refers to the pre-treatment of a raw feed gas stream to partially or completely remove water and, optionally, some heavy hydrocarbons. This can be accomplished by means of a pre-cooling cycle, against an external cooling loop or a cold internal process stream, for example. Water may also be removed by means of pre-treatment with molecular sieves, e.g. zeolites, or silica gel or alumina oxide or other drying agents. Water may also be removed by means of washing with glycol, monoethylene glycol (MEG), diethylene glycol (DEG), triethylene glycol (TEG), or glycerol. The amount of water in the gas feed stream is suitably less than 1 volume percent (vol %), preferably less than 0.1 vol %, more preferably less than 0.01 vol %.

The term "distillation" (or "fractionation") refers to the process of physically separating chemical components into a vapor phase and a liquid phase based on differences in the components' boiling points and vapor pressures at specified temperatures and pressures. Distillation is typically performed in a "distillation column," which includes a series of vertically spaced plates. A feed stream enters the distillation column at a mid-point, dividing the distillation column into two sections. The top section may be referred to as the rectification section, and the bottom section may be referred to as the stripping section. Condensation and vaporization occur on each plate, causing lower boiling point components to rise to the top of the distillation column and higher boiling point components to fall to the bottom. A reboiler is located at the base of the distillation column to add thermal energy. The "bottoms" product is removed from the base of the distillation column. A condenser is located at the top of the distillation column to condense the product emanating from the top of the distillation column, which is called the distillate. A reflux pump is used to maintain flow in the rectification section of the distillation column by pumping a portion of the distillate back into the distillation column.

The term "enhanced oil recovery" (EOR) refers to processes for enhancing the recovery of hydrocarbons from subterranean reservoirs. Techniques for improving displacement efficiency or sweep efficiency may be used for the exploitation of an oil field by introducing displacing fluids or gas into injection wells to drive oil through the reservoir to producing wells.

As used herein, the term "fluid" may be used to refer to gases, liquids, combinations of gases and liquids, combinations of gases and solids, or combinations of liquids and solids.

The term "flue gas" refers to any gas stream generated as a by-product of hydrocarbon combustion.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in natural gas, oil, or chemical processing facilities.

With respect to fluid processing equipment, the term "in series" means that two or more devices are placed along a flow line such that a fluid stream undergoing fluid separation moves from one item of equipment to the next while maintaining flow in a substantially constant downstream direction. Similarly, the term "in line" means that two or more components of a fluid mixing and separating device are connected sequentially or, more preferably, are integrated into a single tubular device.

"Liquefied natural gas" (LNG) is natural gas generally known to include a high percentage of methane. However, LNG may also include trace amounts of other elements or compounds. The other elements or compounds may include, but are not limited to, ethane, propane, butane, $CO_2$, nitrogen, helium, $H_2S$, or any combinations thereof, that have been processed to remove one or more components (for instance, helium) or impurities (for instance, water, acid gas, and/or heavy hydrocarbons) and then condensed into a liquid at almost atmospheric pressure by cooling.

The term "liquid solvent" refers to a fluid in substantially liquid phase that preferentially absorbs one component over another. For example, a liquid solvent may preferentially absorb an acid gas, thereby removing or "scrubbing" at least a portion of the acid gas component from a gas stream or a water stream.

"Natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., $CO_2$ or $H_2S$), or any combinations thereof. The natural gas can also contain minor amounts of contaminants such as water, nitrogen, iron sulfide, wax, crude oil, or any combinations thereof. The natural gas stream may be substantially purified according to embodiments described herein, so as to remove compounds that may act as poisons.

"Non-absorbing gas" refers to a gas that is not significantly absorbed by a solvent during a gas treating or conditioning process.

"Solvent" refers to a substance capable at least in part of dissolving or dispersing one or more other substances, such as to provide or form a solution. The solvent may be polar, nonpolar, neutral, protic, aprotic, or the like. The solvent may include any suitable element, molecule, or compound, such as methanol, ethanol, propanol, glycols, ethers, ketones, other alcohols, amines, salt solutions, ionic liquids, or the like. The solvent may include physical solvents, chemical solvents, or the like. The solvent may operate by any suitable mechanism, such as physical absorption, chemical absorption, or the like.

"Substantial" when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

The term "sweetened gas stream" refers to a fluid stream in a substantially gaseous phase that has had at least a portion of acid gas components removed.

Overview

The present techniques provide for the separation of $CO_2$ and $H_2S$ from a natural gas stream, as well as the separation of the $CO_2$ from the $H_2S$, using a series of co-current contacting systems. More specifically, in various embodiments, the $CO_2$ and $H_2S$ are separated from the natural gas stream by contacting the natural gas stream with a solvent stream within a first series of co-current contacting systems. The resulting sweetened natural gas stream may then be sold into a pipeline or used to produce LNG, for example. The $H_2S$ and $CO_2$ are then removed from the solvent stream by contacting the solvent stream with a stripping gas within a second series of co-current contacting systems. In addition, the $H_2S$ is removed from the $CO_2$ by contacting the stripping gas including the $H_2S$ and the $CO_2$ with an $H_2S$-selective solvent stream within a third series of co-current contacting systems. Further, the $H_2S$ is removed from the $H_2S$-selective solvent stream by contacting the $H_2S$-selective solvent stream with a stripping gas within a fourth series of co-current contacting systems. The recovered $CO_2$ may then be sold or injected into a subterranean reservoir for enhanced oil recovery (EOR) operations, and the recovered $H_2S$ may be sent to a Claus sulfur recovery unit to be converted into elemental sulfur, for example.

The use of a series of co-current contacting systems for natural gas processing and solvent regeneration may allow for a reduction in the size of the overall system as compared to systems that utilize counter-current flow schemes. This may, in turn, reduce the operating costs for the system.

Systems for Removing $CO_2$ and $H_2S$ from Natural Gas

FIG. 1 is a process flow diagram of a chemical solvent-based gas processing system 100. The gas processing system 100 may be used to remove water from a raw natural gas stream 102, generating a dehydrated natural gas stream 104. This may be accomplished by flowing the raw natural gas stream 102 into a contactor 106, which may remove the water from the raw natural gas stream 102. The dehydrated natural gas stream 104 may then be flowed out of the contactor 106 as an overhead stream. In addition, residual water and acid gas components may be removed in connection with a subsequent process, as described further herein.

The raw natural gas stream 102 may be obtained from a subsurface reservoir 108 via any suitable type of hydrocarbon recovery operation. The raw natural gas stream 102 may include a non-absorbing gas, such as methane. In addition, the raw natural gas stream 102 may include acid gas, such as $H_2S$ and $CO_2$. For example, the raw natural gas stream 102 may include about 0% to 10% $H_2S$ and about 0% to 10% $CO_2$, along with the hydrocarbon gas.

As shown in FIG. 1, the raw natural gas stream 102 may be flowed into an inlet separator 110 upon entry into the gas processing system 100. When entering the inlet separator 110, the raw natural gas stream 102 may be under a large amount of pressure. However, the pressure of the raw natural gas stream 102 may vary considerably, depending on the characteristics of the subsurface reservoir 108 from which the gas product is produced. For example, the pressure of the raw natural gas stream 102 may range between atmospheric pressure and several thousand psig. For natural gas treating applications, the pressure of the raw natural gas stream 102 may be boosted to about 100 psig or about 500 psig, or greater, if desired.

The inlet separator 110 may clean the raw natural gas stream 102, for example, to prevent foaming of liquid solvent during a later acid gas treatment process. This may be accomplished by separating the raw natural gas stream into liquid-phase components and gas-phase components. The liquid-phase components may include heavy hydrocarbons, a small portion of water, and impurities such as brine, fracturing fluids, and drilling fluids. Such components may be flowed out of the inlet separator 110 via a bottoms line 114, and may be sent to an oil recovery system 116. The gas-phase components may include natural gas and some amount of impurities, such as acid gases and water. Such components may be flowed out of the inlet separator 110 as the overhead natural gas stream 112.

From the inlet separator 110, the natural gas stream 112 may be flowed into the contactor 106. The contactor 106 may use a desiccant, such as a liquid glycol stream 118, to absorb water in the natural gas stream 112. The liquid glycol stream 118 may include various glycols, such as triethylene glycol, among others. The liquid glycol stream 118 may be stored in a glycol tank 120. A high-pressure pump 122 may force the liquid glycol stream 118 from the glycol tank 120 into the contactor 106 under suitable pressure. For example, the high-pressure pump 122 may boost the pressure of the liquid glycol stream 118 to about 1,500 psig or about 2,500 psig, depending on the pressure of the raw natural gas stream 102.

Once inside the contactor 106, gas within the natural gas stream 112 moves upward through the contactor 106. Typically, one or more trays 124 or other internals are provided within the contactor 106 to create indirect flow paths for the natural gas stream 112 and to create interfacial area between the gas and liquid phases. At the same time, the liquid from the liquid glycol stream 118 moves downward and across the succession of trays 124 in the contactor 106. The trays 124 aid in the interaction of the natural gas stream 112 with the liquid glycol stream 118.

The contactor 106 operates on the basis of a countercurrent flow scheme. In other words, the natural gas stream 112 is directed through the contactor 106 in one direction, while the liquid glycol stream 118 is directed through the contactor 106 in the opposite direction. As the two fluid materials interact, the down-flowing liquid glycol stream 118 absorbs water from the up-flowing natural gas stream 112 to produce the dehydrated natural gas stream 104.

Upon exiting the contactor 106, the dehydrated natural gas stream 104 can be flowed through an outlet separator 126. The outlet separator 126, also referred to as a scrubber, may allow any liquid glycol carried over from the contactor 106 to fall out of the dehydrated natural gas stream 104. A final dehydrated natural gas stream 128 may be flowed out of the outlet separator 126 via an overhead line 130. Any residual liquid glycol 132 may drop out through a bottoms line 134.

A spent desiccant stream 136 may flow out of the bottom of the contactor 106. The spent desiccant stream 136 may be a glycol solution that is rich in the absorbed water. The spent desiccant stream 136 may be at a relatively high temperature, such as about 90° F. to about 102° F., or higher. In various embodiments, the gas processing system 100 includes equipment for regenerating the liquid glycol stream 118 from the spent desiccant stream 136, as described further herein.

From the contactor 106, the spent desiccant stream 136 may be heated within a heat exchanger 138 and then flowed into a regenerator 144. The regenerator 144 may be used to regenerate the liquid glycol stream 118 from the spent desiccant stream 136. The regenerator 144 may be a large pressure vessel, or interconnected series of pressure vessels, that operates at about 15 psig to about 25 psig, for example. The regenerator may include a reboiler 140 that is coupled to a distillation column 142.

The spent desiccant stream 136 can be flowed through a tube bundle 146 in the top of the distillation column 142. High-temperature water vapor and off-gases 148 being released from the distillation column 142 may preheat the spent desiccant stream 136 as it flows through the tube bundle 146, before the water vapor and off-gases 148 are released via an overhead line 150.

After being preheated within the distillation column 142, the spent desiccant stream 136 may be released from the tube bundle 146 as a warmed glycol stream 152. The warmed glycol stream 152 may be flowed into a flash drum 154. The flash drum 154 may operate at a pressure of about 50 psig to about 100 psig, for example. The flash drum 154 may have internal parts that create a mixing effect or a tortuous flow path for the glycol stream 152.

Residual gases 156, such as methane, $H_2S$, and $CO_2$, may be flashed out of the flash drum 154 via an overhead line 158. The residual gases 156 captured in the overhead line 158 may be reduced to an acid gas content of about 100 ppm if contacted with an amine. This concentration of acid gases is small enough that the residual gases 156 can be used as fuel gas for the gas processing system 100.

In addition, any entrained heavier hydrocarbons, such as hexane or benzene, within the glycol stream 152 may be separated within the flash drum 154 as a liquid of lesser density than the glycol. The resulting hydrocarbon stream 160 may be flowed out of the flash drum 154 via a bottoms line 162.

Further, as the temperature and pressure of the glycol stream 152 drops within the flash drum 154, the hydrocarbons within the glycol stream 152 are separated out, producing a partially-purified glycol stream 164. The partially-purified glycol stream 164 may then be released from the flash drum 154. The partially-purified glycol stream 164 may be flowed through a filter 166, such as a mechanical filter or carbon filter, for particle filtration.

The resulting filtered glycol stream 168 may then be flowed through a heat exchanger 170. Within the heat exchanger 170, the filtered glycol stream 168 may be heated via heat exchange with the liquid glycol stream 118. The resulting high-temperature glycol stream 174 may be flowed into the distillation column 142 of the regenerator 144. As the high-temperature glycol stream 174 travels through the distillation column 142, water vapor and off-gases 148, such as $H_2S$ and $CO_2$, may be removed from the high-temperature glycol stream 174.

The high-temperature glycol stream 174 may be flowed out of the bottom of the distillation column 142 and into the reboiler 140. In addition, the reboiler 140 may boil off residual water vapor and off-gases 148 from the high-temperature glycol stream 174. The components that are boiled off may travel upward through the distillation column 142 and be removed as the water vapor and off-gases 148 in the overhead line 150.

The regenerator 144 may also include a separate stripping section 176 fed from the liquid pool in the reboiler 140. The stripping section 176 may include packing that promotes further distillation, as well as dry stripping gas, e.g., cryogenically-generated nitrogen. Any remaining impurities, such as water, $H_2S$, and/or $CO_2$, boil off and join the water vapor and off-gases 148 in the overhead line 150. The high-temperature glycol stream 174 may then be flowed into a surge tank 178, from which it may be released as the liquid glycol stream 118.

The regenerated liquid glycol stream 118 may be pumped out of the surge tank 178 via a booster pump 180. The booster pump 180 may increase the pressure of the liquid glycol stream 118 to about 50 psig, for example.

The liquid glycol stream 118 may then be flowed through the heat exchanger 170, in which the liquid glycol stream 118 may be partially cooled via heat exchange with the filtered glycol stream 168. The liquid glycol stream 118 may be stored in the glycol tank 120. The high-pressure pump 122 may then force the liquid glycol stream 118 from the glycol tank 120 through a cooler 182 prior to being returned to the contactor 106. The cooler 182 may cool the liquid glycol stream 118 to ensure that the glycol will absorb water when it is returned to the contactor 106. For example, the cooler 182 may chill the liquid glycol stream 118 to about 100° F. or 125° F.

The process flow diagram of FIG. 1 is not intended to indicate that the gas processing system 100 is to include all of the components shown in FIG. 1. Further, any number of additional components may be included within the gas processing system 100, depending on the details of the specific implementation. For example, additional heat may be provided to the reboiler 140 to assist in flashing off the water. Further, the gas processing system 100 may include any suitable types of heaters, chillers, condensers, liquid pumps, gas compressors, blowers, bypass lines, other types of separation and/or fractionation equipment, valves, switches, controllers, and pressure-measuring devices, temperature-measuring devices, level-measuring devices, or flow-measuring devices, among others.

FIG. 1 demonstrates the use of a known contactor 106 in the context of a gas dehydration process. However, the gas processing system 100 is also substantially representative of a sour gas removal operation. In that instance, the liquid stream 118 includes a chemical solvent, such as a primary amine, a secondary amine, or a tertiary amine. The liquid stream 118 may also be an ionic liquid or a blend of a physical solvent with an amine. For purposes of discussion, the liquid stream 118 may be interchangeably referred to herein as an amine, a chemical solvent, or an absorbent liquid.

In some embodiments, a solvent that preferentially removes $H_2S$ molecules over $CO_2$ molecules may be used. For example, a tertiary amine typically does not effectively strip out $CO_2$ as quickly as $H_2S$. Therefore, two separate gas processing systems 100 may be sequentially operated, with one configured to strip out primarily $H_2S$, and the other configured to strip out primarily $CO_2$. A separate $CO_2$ stream that is substantially free of $H_2S$ may also be generated.

Regardless of the application and the solvent used, the disadvantage of gas processing systems that include counter-current flow schemes, such as the gas processing system 100 of FIG. 1, is that comparatively low velocities are required to avoid entrainment of the down-flowing liquid solvent in the natural gas stream 102. Also, relatively long distances are required for disengagement of the liquid droplets from the natural gas stream 102. Depending on the flow rate of the natural gas stream 102, the contactor 106 can be greater than 15 feet in diameter, and more than 100 feet tall. For high-pressure applications, the vessel has thick, metal walls. Consequently, counter-current contactor vessels can be large and very heavy. This is generally undesirable, particularly for offshore oil and gas recovery applications.

In the gas processing system 100 of FIG. 1, the contactor 106 includes a single contacting tower. However, in some applications, more than one contacting tower may be used. In addition, very large contactors may be used for high-volume, high-pressure applications. In the case of low-pressure applications, such as $CO_2$ removal from flue gas at a power generation plant, it is estimated that a 50 foot by 50 foot duct contactor would be used for a relatively small, 500 megawatt power plant flue gas application. Many hundreds of gallons per minute of solvent would also be flowed through the contactor. Thus, such operations may become very costly.

Further, the internals of the tower 106 can make it susceptible to wave motion in an offshore environment. Therefore, it may be desirable to have a mass transfer process that does not rely on conventional tower internals. For example, it may be desirable to utilize a series of low pressure-drop, small contacting devices to remove $CO_2$ and $H_2S$ from flash-gas streams.

Embodiments described herein utilize a co-current flow scheme as an alternative to the counter-current flow scheme demonstrated in the contactor 106 of FIG. 1. The co-current flow scheme utilizes one or more co-current contacting systems connected in series within a pipe. A natural gas stream and a liquid solvent may move together, i.e., co-currently, within the co-current contacting systems. In some embodiments, the natural gas stream and the liquid solvent move together generally along the longitudinal axis of the respective co-current contacting system. In general, co-current contactors can operate at much higher fluid velocities than counter-current contactors. As a result, co-current contactors tend to be smaller than counter-current contactors that utilize standard packed or trayed towers.

Figure 2A:
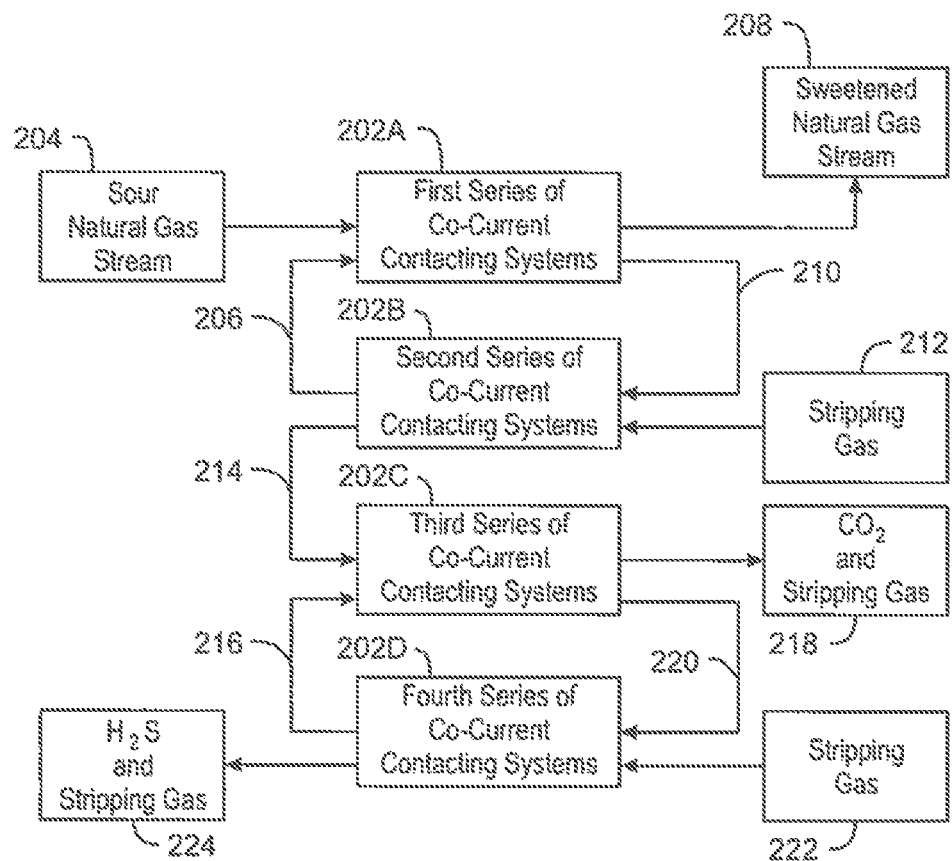
FIG. 2A is a generalized process flow diagram of a system for recovering carbon dioxide ($CO_2$) and hydrogen sulfide ($H_2S$) from a natural gas stream that includes a co-current flow scheme.

FIG. 2A is a generalized process flow diagram of a system 200 for separating $CO_2$ and $H_2S$ from a natural gas stream that includes a co-current flow scheme. The system 200 may function as an all-in-one gas processing system, solvent regeneration system, and acid gas recovery system. Moreover, the system 200 may be an alternative to the gas processing system 100 described with respect to FIG. 1.

The system 200 may employ a number of co-current contacting systems (CCCS's). Specifically, the system 200 may employ a first series of co-current contacting systems 202A, a second series of co-current contacting systems 202B, a third series of co-current contacting systems 202C, and a fourth series of co-current contacting systems 202D. Moreover, it is to be understood that the system 200 is not limited to the series of co-current contacting systems 202A-D shown in FIG. 2. For example, in some embodiments, the system 200 may only include the first and second series of co-current contacting systems 202A and 202B, or may only include the first, second, and third series of co-current contacting systems 202A-C, depending on the details of the specific implementation. In other embodiments, the system 200 may include any number of additional series of co-current contacting systems not shown in FIG. 2.

Each co-current contacting system within the series of co-current contacting systems 202A-D includes a co-current contactor upstream of a separation system. In addition, each series of co-current contacting systems 202A-D may include any number of co-current contacting systems connected in series. Further, in some embodiments, one or more of the series of co-current contacting systems 202A-D may include only one co-current contacting system.

According to the embodiment shown in FIG. 2A, the first series of co-current contacting systems 202A contacts a sour natural gas stream 204 from a hydrocarbon production operation, for example, with a lean solvent stream 206, producing a sweetened natural gas stream 208 and a rich solvent stream 210 including $CO_2$ and $H_2S$. In various embodiments, the sweetened natural gas stream 208 is then sold into a pipeline or used to produce LNG.

From the first series of co-current contacting systems 202A, the rich solvent stream 210 is flowed into the second series of co-current contacting systems 202B, along with a stripping gas 212. The second series of co-current contacting systems 202B contact the rich solvent stream 210 with the stripping gas 212, regenerating the lean solvent stream 206 and producing a gas stream 214 including the stripping gas, $CO_2$, and $H_2S$. In various embodiments, the lean solvent stream 206 is then recirculated to the first series of co-current contacting systems 202A.

From the second series of co-current contacting systems 202B, the gas stream 214 including the stripping gas, $CO_2$, and $H_2S$ is flowed into the third series of co-current contacting systems 202C, along with a lean $H_2S$-selective solvent stream 216. The third series of co-current contacting systems 202C contacts the gas stream 214 with the $H_2S$-selective solvent stream 216, producing a gas stream 218 that includes the $CO_2$ and the stripping gas, as well as a rich $H_2S$-selective solvent stream 220 that includes the $H_2S$. In some embodiments, the $CO_2$ within the gas stream 218 is then sold or injected into a subterranean reservoir for enhanced oil recovery (EOR) operations.

From the third series of co-current contacting systems 202C, the rich $H_2S$-selective solvent stream 220 is flowed into the fourth series of co-current contacting systems 202D, along with a stripping gas 222. The fourth series of co-current contacting systems 202D contact the rich $H_2S$-selective solvent stream 220 with the stripping gas 222, regenerating the lean $H_2S$-selective solvent stream 216 and producing a gas stream 224 including the $H_2S$ and the stripping gas. In various embodiments, the lean $H_2S$-selective solvent stream 216 is then recirculated to the third series of co-current contacting systems 202C. In addition, in some embodiments, the $H_2S$ within the gas stream 224 is then sent to a Claus sulfur recovery unit to be converted into elemental sulfur.

Figures 1, 2B:
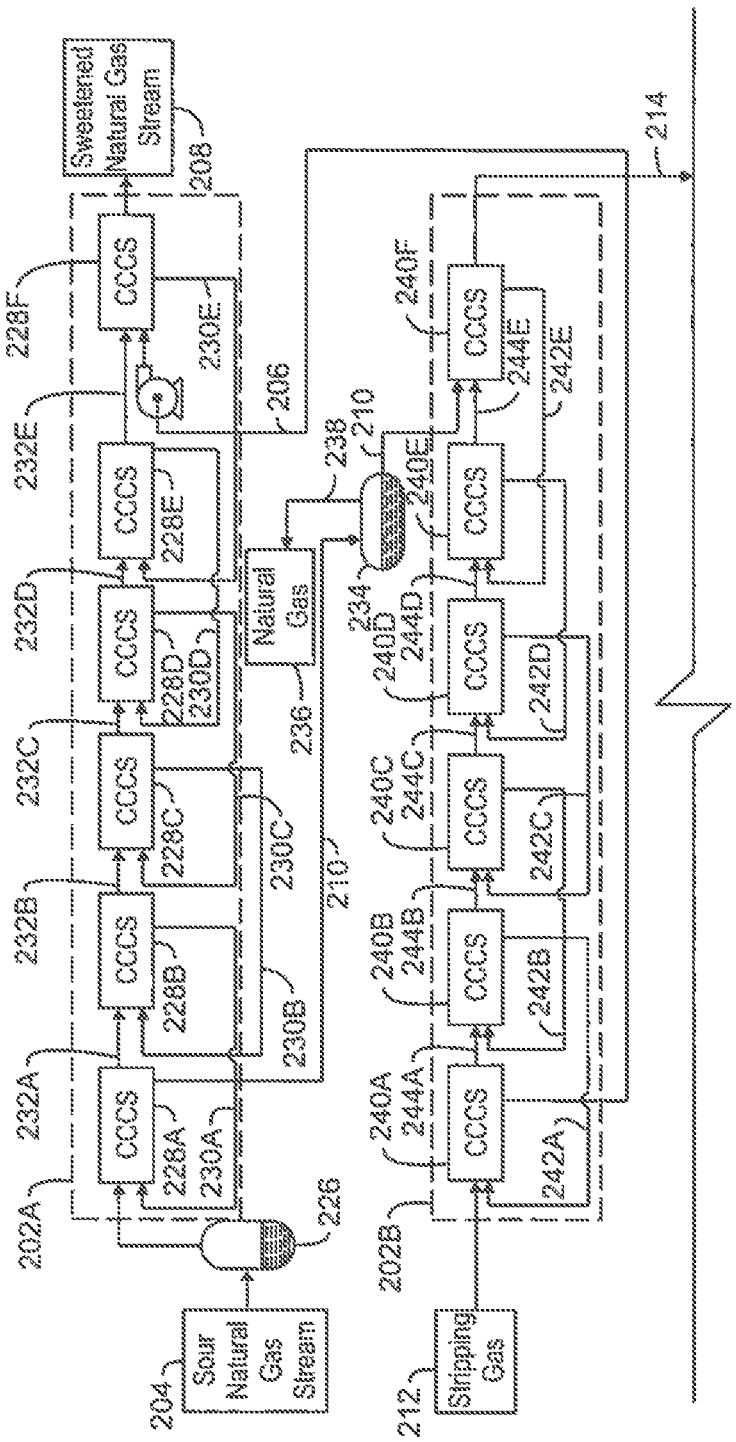
Figures 2, 2B:
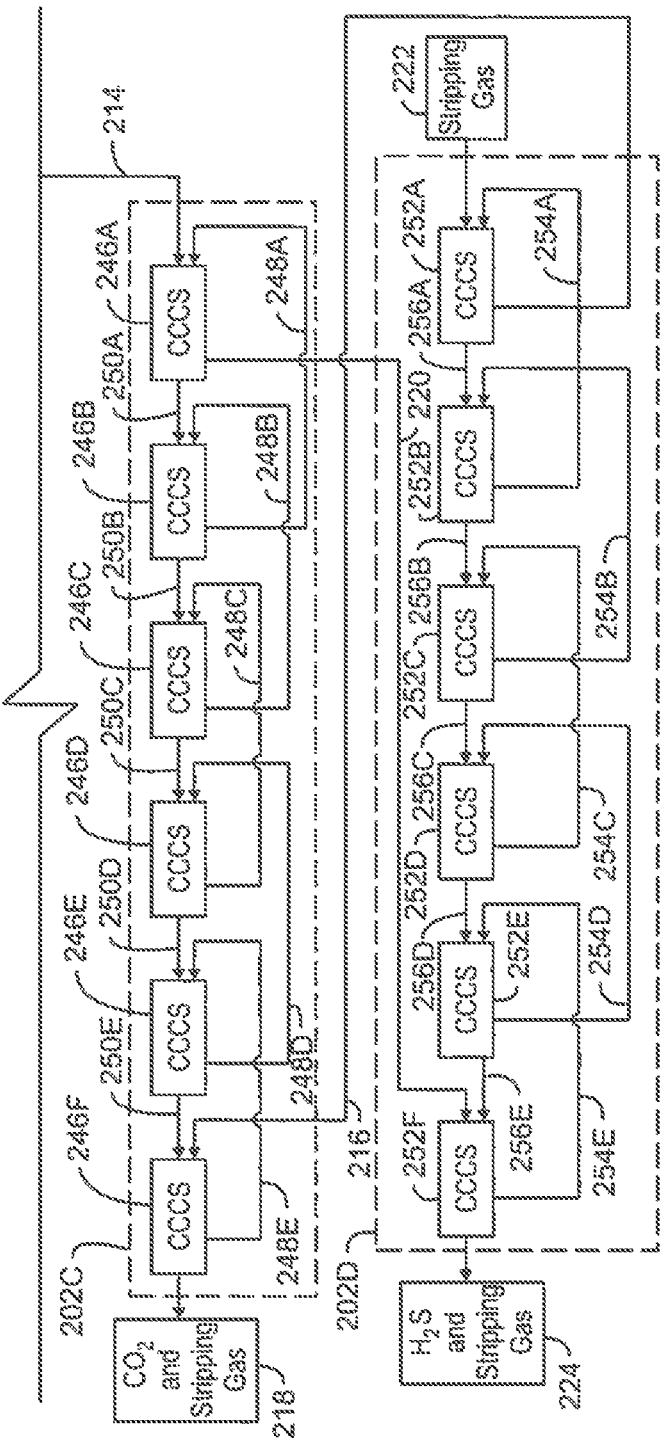

FIGS. 2B-1 and 2B-2 are a process flow diagram of an exemplary embodiment of the system 200 of FIG. 2A. Like numbered items are as described with respect to FIG. 2A. The sour natural gas stream 204 may be flowed through an inlet separator 226. The inlet separator 226 may be used to clean the sour natural gas stream 204 by filtering out impurities, such as brine and drilling fluids. Some particle filtration may also take place. The cleaning of the sour natural gas stream 204 can prevent foaming of solvent during the acid gas treatment process.

In some embodiments, the sour natural gas stream 204 may also be pretreated upstream of the inlet separator 226 or the first series of co-current contacting systems 202A. For example, the sour natural gas stream 204 may undergo a water wash to remove glycol or other chemical additives. This may be accomplished via a separate processing loop (not shown) wherein water is introduced to the gas, such as via an additional co-current contacting system. Water has an affinity for glycol and will pull the glycol out of the sour natural gas stream 204. This, in turn, will help control foaming within the first series of co-current contacting systems 202A. In the case of flue gas applications, corrosion inhibitors may be added to the solvent to retard the reaction of $O_2$ with the steel in the processes.

From the inlet separator 226, the sour natural gas stream 204 may be flowed into the first series of co-current contacting systems 202A, where it is mixed with the lean solvent stream 206. The solvent stream 206 may include an amine solution, such as monoethanol amine (MEA), diethanol amine (DEA), or methyldiethanol amine (MDEA). Other solvents, such as physical solvents, alkaline salts solutions, or ionic liquids, may also be used for $H_2S$ removal. In various embodiments, the lean solvent stream 206 is a solvent stream that has undergone a desorption process for the removal of acid gas impurities. Specifically, the lean solvent stream 206 introduced into the first series of co-current contacting systems 202A includes lean solvent that has been regenerated via the second series of co-current contacting systems 202B.

The first series of co-current contacting systems 202A may include six co-current contacting systems 228A-F connected in series. Each co-current contacting system 228A-F removes a portion of the acid gas content, i.e., the $CO_2$ and $H_2S$, from the natural gas stream 204, thereby releasing a progressively sweetened natural gas stream in a downstream direction. The final co-current contacting system 228F provides the final sweetened natural gas stream 208.

The sour natural gas stream 204 is flowed into the first co-current contacting system 228A within the first series of co-current contacting systems 202A. In addition, a first partially-loaded, or "rich," solvent stream 230A is flowed from the second co-current contacting system 228B into the first co-current contacting system 228A. Once inside the first co-current contacting system 228A, the sour natural gas stream 204 and the first partially-loaded solvent stream 230A move along the longitudinal axis of the first co-current contacting system 228A. As they travel, the first partially-loaded solvent stream 230A interacts with the $CO_2$ and $H_2S$ in the sour natural gas stream 204, causing the $CO_2$ and $H_2S$ to chemically attach to or be absorbed by the amine molecules of the first partially-loaded solvent stream 230A. The rich solvent stream 210 may then be flowed out of the first co-current contacting system 228A. In addition, a first partially-sweetened natural gas stream 232A may be flowed out of the first co-current contacting system 228A and into a second co-current contacting system 228B.

A third co-current contacting system 228C may be provided after the second co-current contacting system 228B, and a fourth co-current contacting system 228D may be provided after the third co-current contacting system 228C. In addition, a fifth co-current contacting system 228E may be provided after the fourth co-current contacting system 228D, and a final co-current contacting system 228F may be provided after the fifth co-current contacting system 228E. Each of the second, third, fourth, and fifth co-current contacting systems 228B, 228C, 228D, and 228E may generate a respective partially-sweetened natural gas stream 232B, 232C, 232D, and 232E. In addition, each of the third, fourth, fifth, and final co-current contacting systems 228C, 228D, 228E, and 228F may generate respective partially-loaded solvent stream 230B, 230C, 230D, and 230E. If an amine is used as the solvent stream 206, the partially-loaded solvent stream 230A-E may include rich amine solutions.

As the progressively-sweetened natural gas streams 232A-E are generated, the gas pressure in the system 200 will gradually decrease. As this occurs, the liquid pressure of the progressively-richer solvent streams 230A-E may be correspondingly increased. This may be accomplished by placing one or more booster pumps (not shown) between each co-current contacting system 228A-F to boost liquid pressure in the system 200.

The rich solvent stream 210 exiting the first series of co-current contacting systems 202A is flowed through a flash drum 234. Absorbed natural gas 236 may be flashed from the rich solvent stream 210 within the flash drum 234, and may be flowed out of the flash drum 234 via an overhead line 238.

The rich solvent stream 226 is then flowed from the flash drum 234 to the second series of co-current contacting systems 202B. The second series of co-current contacting systems 202B may include six co-current contacting systems 240A-F connected in series. Each co-current contacting system 240A-F removes a portion of the $CO_2$ and $H_2S$ from the rich solvent stream 210, thereby releasing the lean solvent stream 206 and the gas stream 214 including the stripping gas, $CO_2$, and $H_2S$. The lean solvent stream 206 may then be recirculated to the first series of co-current contacting systems 202A, while the gas stream 214 may be flowed into the third series of co-current contacting systems 202C.

In various embodiments, the stripping gas 212 is flowed into the first co-current contacting system 240A within the second series of co-current contacting systems 202B. In addition, a first partially-unloaded, or "lean," solvent stream 242A is flowed from the second co-current contacting system 240B into the first co-current contacting system 240A. Once inside the first co-current contacting system 240A, the stripping gas 212 and the first partially-unloaded solvent stream 242A move along the longitudinal axis of the first co-current contacting system 240A. As they travel, the first partially-unloaded solvent stream 242A interacts with the stripping gas 212, causing any remaining $CO_2$ and $H_2S$ within the first partially-unloaded solvent stream 242A to chemically detach or desorb from the amine molecules to the stripping gas 212. The resulting lean solvent stream 206 may then be flowed out of the first co-current contacting system 240A within the second series of co-current contacting systems 202B, and may be recirculated to the first series of co-current contacting systems 202A. In addition, a first gas mixture 244A including the stripping gas, the $CO_2$, and the $H_2S$ may be flowed out the first co-current contacting system 240A and into a second co-current contacting system 240B.

A third co-current contacting system 240C may be provided after the second co-current contacting system 240B, and a fourth co-current contacting system 240D may be provided after the third co-current contacting system 240C. In addition, a fifth co-current contacting system 240E may be provided after the fourth co-current contacting system 240D, and a final co-current contacting system 240F may be provided after the fifth co-current contacting system 240E. Each of the second, third, fourth, and fifth co-current contacting systems 240B, 240C, 240D, and 240E may generate a respective gas mixture 244B, 244C, 244D, and 244E including $CO_2$ and $H_2S$. In addition, each of the third, fourth, fifth, and final co-current contacting systems 240C, 240D, 240E, and 240F may generate respective partially-unloaded solvent stream 242B, 242C, 242D, and 242E.

From the second series of co-current contacting systems 202B, the resulting gas stream 214 including the stripping gas, $CO_2$, and $H_2S$ is flowed into the third series of co-current contacting systems 202C. The third series of co-current contacting systems 202C may include six co-current contacting systems 246A-F connected in series. Each co-current contacting system 246A-F removes a portion of the $H_2S$ from the gas stream 214, thereby releasing the rich $H_2S$-selective solvent stream 220 including the $H_2S$ and the gas stream 218 including the $CO_2$ and the stripping gas. The $CO_2$ within the gas stream 218 may then be used as part of a miscible EOR operation to recover oil, for example. In addition, the rich $H_2S$-selective solvent stream 220 may be flowed into the fourth series of co-current contacting systems 202D for the removal of the $H_2S$.

In various embodiments, the gas stream 214 including the stripping gas, $CO_2$, and $H_2S$ is flowed into the first co-current contacting system 246A within the third series of co-current contacting systems 202C. In addition, a first partially-loaded, or "rich," $H_2S$-selective solvent stream 248A including some amount of $H_2S$ is flowed from the second co-current contacting system 246B into the first co-current contacting system 246A. Once inside the first co-current contacting system 246A, the gas stream 214 and the partially-loaded $H_2S$-selective solvent stream 248A move along the longitudinal axis of the first co-current contacting system 246A. As they travel, the first partially-loaded $H_2S$-selective solvent stream 248A interacts with the $H_2S$ within the gas stream 214, causing the $H_2S$ to chemically attach to or be absorbed by the molecules of the first partially-loaded $H_2S$-selective solvent stream 248A. The resulting rich $H_2S$-selective solvent stream 220 including the $H_2S$ may then be flowed out of the third series of co-current contacting systems 202C and into the fourth series of co-current contacting systems 202D. In addition, a first gas mixture 250A including the stripping gas and the $CO_2$, as well as a decreased amount of the $H_2S$, may be flowed out of the first co-current contacting system 246A and into a second co-current contacting system 246B.

A third co-current contacting system 246C may be provided after the second co-current contacting system 246B, and a fourth co-current contacting system 246D may be provided after the third co-current contacting system 246C. In addition, a fifth co-current contacting system 246E may be provided after the fourth co-current contacting system 246D, and a final co-current contacting system 246F may be provided after the fifth co-current contacting system 246E. Each of the second, third, fourth, and fifth co-current contacting systems 246B, 246C, 246D, and 246E may generate a respective gas mixture 250B, 250C, 250D, and 250E including the stripping gas and the $CO_2$, as well as progressively decreasing amount of $H_2S$. In addition, each of the third, fourth, fifth, and final co-current contacting systems 246C, 246D, 246E, and 246F may generate respective partially-loaded $H_2S$-selective solvent streams 248B, 248C, 248D, and 248E.

In various embodiments, the $H_2S$-selective solvent stream that is used within the third series of co-current contacting systems 202C is a specially-designed solvent that enhances the selectivity of $H_2S$ over $CO_2$ within the co-current contacting systems 246A-F. Acid gases react reversibly with solvents via different routes. For example, in the case of physical solvents such as methanol, absorption occurs due to van der Waals attraction for the polar $H_2S$ and polarizable $CO_2$ molecules. As another example, in the case of chemical solvents such as amines, the reaction is chemical in nature.

Specifically, for $H_2S$, the only route is an acid-base reaction, as shown below in Eqs. (1) and (2).

$$H_2S_{(aq)} \leftrightarrow H^+ + HS^- \qquad (1)$$

$$NR_1R_2R_3 + H^+ + HS^- \leftrightarrow NHR_1R_2R_3^+ + HS^- \qquad (2)$$

In Eq. (2), $R_1$, $R_2$, and $R_3$ represent organic substituents attached to the nitrogen atom of the tertiary amine. With tertiary amines, $CO_2$ can react only via the acid-base route, as shown below in Eqs. (3)-(5).

$$H_2O + CO_2 \leftrightarrow [H_2CO_3] \qquad (3)$$

$$[H_2CO_3] \leftrightarrow H\,H^+ + HCO_3^- \qquad (4)$$

$$NR_1R_2R_3 + H^+ + HCO_3^- \leftrightarrow NHR_1R_2R_3^+ + HCO_3^- \qquad (5)$$

If the amine is a secondary amine that includes one hydrogen atom attached to the nitrogen atom, or a primary amine that includes two hydrogen atoms attached to the nitrogen atom, $CO_2$ can react to form a carbamate, as shown below in Eq. (6).

$$CO_2 + 2R_1R_2NH \leftrightarrow (R_1R_2NH_2^+)(R_1R_2HCOO^-) \qquad (6)$$

Because $CO_2$ and $H_2S$ react with chemical solvents via such different routes, the use of a specially-designed solvent within the co-current contacting systems described herein may allow for the selective removal of $H_2S$ from a gas stream that includes both $H_2S$ and $CO_2$. In various embodiments, the specially-designed solvent is a tertiary amine. However, it is to be understood that the specially-designed may also be any other suitable solvent that is capable of selectively absorbing $H_2S$ over $CO_2$, such as sterically-hindered amines.

Because the $H_2S$ reaction is almost instantaneous relative to the $CO_2$ reaction, lowering the residence time of the gas stream 214 and the $H_2S$-selective solvent stream within each co-current contacting systems 246A-F may enhance the selective removal of $H_2S$ from the gas stream 214. Therefore, the co-current contacting systems 246A-F may be designed such that the residence time is relatively short.

The rich $H_2S$-selective solvent stream 220 including the $H_2S$ may be flowed from the third series of co-current contacting systems 202C into the fourth series of co-current contacting systems 202D for the recovery of the $H_2S$ and regeneration of the lean $H_2S$-selective solvent stream 216. The fourth series of co-current contacting systems 202D may include six co-current contacting systems 252A-F connected in series. Each co-current contacting system 252A-F removes a portion of the $H_2S$ from the rich $H_2S$-selective solvent stream 220, thereby releasing the lean $H_2S$-selective solvent stream 216 and the gas stream 224 including the $H_2S$ and the stripping gas. The lean $H_2S$-selective solvent stream 216 may then be recirculated to the third series of co-current contacting systems 202C. In addition, the $H_2S$ within the gas stream 224 may then be converted into elemental sulfur using a Claus sulfur recovery unit.

In various embodiments, the stripping gas 222 is flowed into the first co-current contacting system 252A within the fourth series of co-current contacting systems 202D. In addition, a first partially-unloaded, or "lean," $H_2S$-selective solvent stream 254A is flowed from the second co-current contacting system 252B into the first co-current contacting system 252A. Once inside the first co-current contacting system 252A, the stripping gas 222 and the first partially-unloaded $H_2S$-selective solvent stream 254A move along the longitudinal axis of the first co-current contacting system 252A. As they travel, the first partially-unloaded s $H_2S$-selective solvent stream 254A interacts with the stripping gas 222, causing any remaining $H_2S$ within the first partially-unloaded $H_2S$-selective solvent stream 254A to chemically detach or desorb from the amine molecules of the stripping gas 222. The resulting lean $H_2S$-selective solvent stream 216 may then be flowed out of the fourth series of co-current contacting systems 202D, and may be recirculated to the third series of co-current contacting systems 202C. In addition, a first gas mixture 256A including the stripping gas and the $H_2S$ may be flowed out of the first co-current contacting system 252A and into a second co-current contacting system 252B.

A third co-current contacting system 252C may be provided after the second co-current contacting system 252B, and a fourth co-current contacting system 252D may be provided after the third co-current contacting system 252C. In addition, a fifth co-current contacting system 252E may be provided after the fourth co-current contacting system 252D, and a final co-current contacting system 252F may be provided after the fifth co-current contacting system 252E. Each of the second, third, fourth, and fifth co-current contacting systems 252B, 252C, 252D, and 252E may generate a respective gas mixture 256B, 256C, 256D, and 256E including the stripping gas and an increasing amount of $H_2S$. In addition, each of the third, fourth, fifth, and final co-current contacting systems 252C, 252D, 252E, and 252F may generate respective partially-unloaded $H_2S$-selective solvent stream 254B, 254C, 254D, and 254E.

The process flow diagrams of FIGS. 2A, 2B-1, and 2B-2 are not intended to indicate that the system 200 is to include all of the components shown in FIGS. 2A, 2B-1, and 2B-2. Further, any number of additional components may be included within the system 200, depending on the details of the specific implementation. For example, the system 200 may include any suitable types of heaters, chillers, condensers, liquid pumps, gas compressors, blowers, bypass lines, other types of separation and/or fractionation equipment, valves, switches, controllers, and pressure-measuring devices, temperature-measuring devices, level-measuring devices, or flow-measuring devices, among others.

Figure 3:
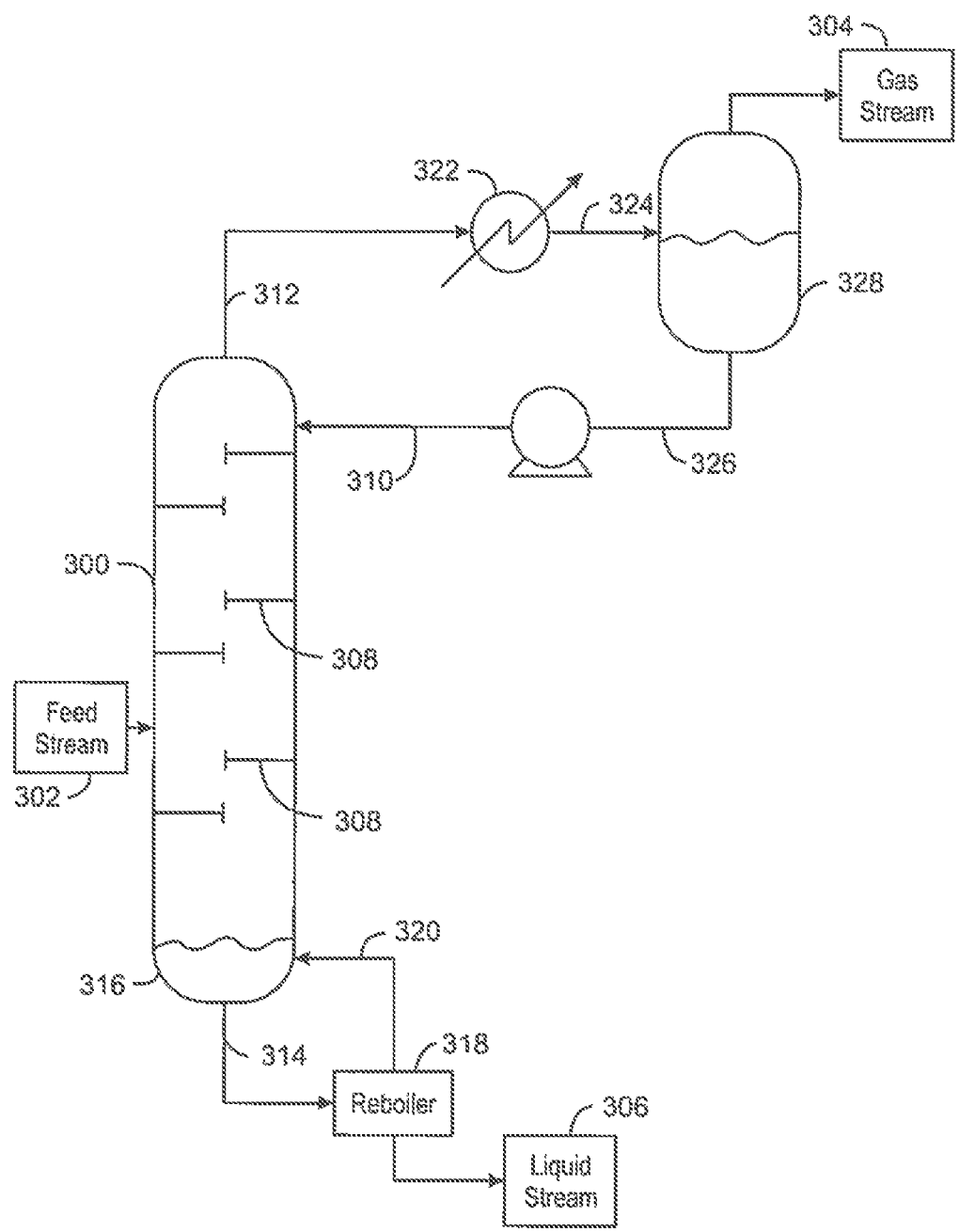
FIG. 3 is a schematic of a column for separating a feed stream into a gas stream and a liquid stream.

FIG. 3 is a schematic of a column 300 for separating a feed stream 302 into a gas stream 304 and a liquid stream 306. The feed stream 302 may be a gas stream that includes two or more different components with different boiling points and vapor pressures, such as an absorbent solvent and a gas contaminant. The column 300 may be similar to the columns used in the regeneration system described with respect to FIG. 1.

The column 300 may include a number of trays 308 or other internals that create indirect flow paths for the feed stream 302 and create interfacial area between the gas and liquid phases. The feed stream 302 may be injected into an upper or middle portion of the column 300, between trays 308. The gas within the feed stream 302 moves upward through the column 300. At the same time, any liquid within the column 300 moves downward and across the succession of trays 308 in the column 300. In addition, the liquid may include a reflux stream 310 that is reinjected into the top portion of the column 300, as described further herein.

The column 300 may utilize a variety of separation technologies, depending on the species in the feed stream 302. For example, the column may be a distillation column, a countercurrent separation column, or a regeneration column, among others.

For a distillation column, the feed stream 302 may include a mixture of liquids with slightly different boiling points. In this case, the column 302 is a distillation column that functions to separate the species by the differences in boiling point. The trays 308 determine the number of theoretical plates, and, thus, the separation efficiency of the column 300.

In a countercurrent column, the feed stream 302 may include a mixture of gases, such as methane and $H_2O$ or $H_2S$. As the gases flow upwards through the falling stream of liquid, one gas species is preferentially absorbed by the liquid, lowering its concentration in the gas rising to the top of the column 300. In some embodiments, the liquid includes a physical solvent (not shown) that is injected into a top portion of the column 300. More specifically, the liquid and vapor phases may be counter-currently contacted to effect separation of a fluid mixture based on chemical affinities, boiling point difference, or vapor pressure differences, or combinations thereof.

In a regeneration column, the feed stream includes a liquid that contains a dissolved or adsorbed gas. As the liquid falls through the column 300, the gas is released and exits through the top of the column 300.

The component that concentrates in the gas phase may be flowed out of the top of the column 300 as an overhead gas stream 312, while the component that concentrates in the liquid phase may be flowed out of the bottom of the column 300 as a bottoms liquid stream 314. In addition, some amount of liquid 316 may be allowed to collect in the bottom of the column 300 before being flowed out of the column 300 in order to provide for increased separation of the gas phase from the liquid phase.

The bottoms liquid stream 314 may be flowed through a reboiler 318. The reboiler 318 may increase the temperature of the bottoms liquid stream 314, vaporizing a portion of the bottoms liquid stream 314, which may include components in the liquid, or a portion of the liquid itself. The resulting stream 320 may be flowed back into the bottom portion of the column 300 to provide heat to the liquids 316 collecting in the bottom of the column 300.

A portion of the overhead gas stream 312 may be cooled and at least partially condensed within a heat exchanger 322. The cooled gas stream 324 may then be separated into the gas stream 304 and a liquid stream 326 within a separation vessel 328. The liquid stream 326 may be pumped back into the top portion of the column 300 as the reflux stream 310. Within the column 300, the reflux stream 310 may be used to enhance the performance of the column 300 by increasing the degree of separation between the liquid phase and the gas phase.

In practice, the column 300 may be very large and heavy. This may create difficulty in many applications, such as offshore oil and gas production applications. Therefore, the co-current contacting system described herein may provide a desirable alternative to the column 300.

Figure 4A:
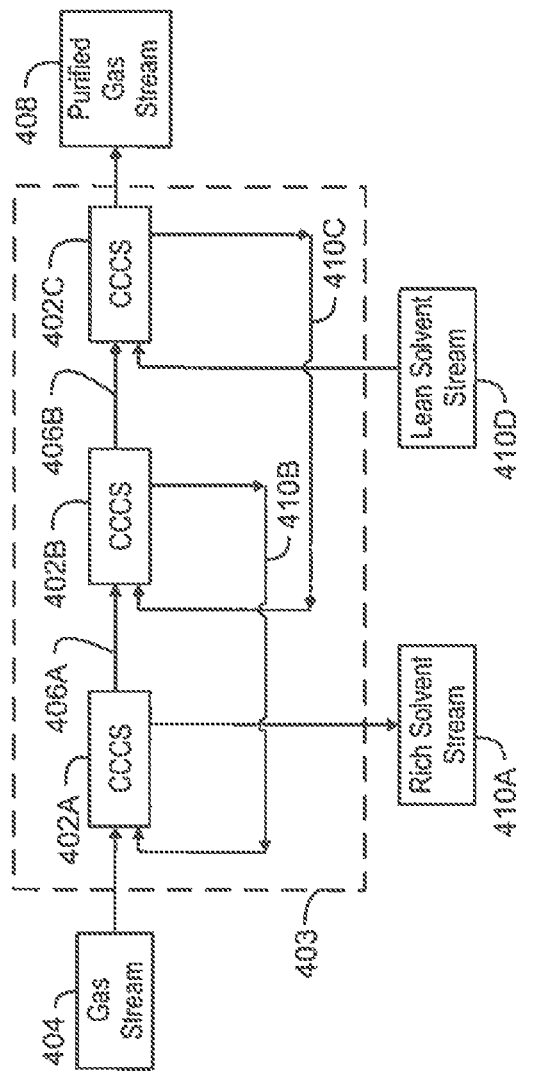
FIG. 4A is a process flow diagram of a separation system including a number of co-current contacting systems that may be placed in a shell.

FIG. 4A is a process flow diagram of a separation system 400 including a number of co-current contacting systems 402A-C that may be placed in a shell 403. In this embodiment, the separation system 400 may be analogous to a separation column, for example, as described with respect to FIG. 3, in which each of the co-current contacting systems 402A-C are acting as bed packing. In some embodiments, the shell 403 is a permanent, climate-controlled structure. In other embodiments, the shell 403 is a temporary or portable structure. In other embodiments, the shell 403 is an insulated jacket. In various embodiments, the separation system 400 is implemented as part of the system 200 described with respect to FIGS. 2A, 2B-1, and 2B-2. For example, the separation system 400 may be one of the series of co-current contacting systems 202A-D within the system 200 of FIGS. 2A, 2B-1, and 2B-2. In the illustrative arrangement shown in FIG. 4A, a first co-current contacting system 402A, a second co-current contacting system 402B, and a third co-current contacting system 402C are provided, each residing within the single shell 403.

In various embodiments, due to the pump requirements on the liquid streams, the inter-stage liquid streams may be flowed through the shell 403. The shell 403 may be designed to keep the equipment and the solvent streams flowing therein cool. This may be done through climate control within the shell 403 or through the circulation of a cooling medium adjacent to the shell 403.

A first gas stream 404 may be flowed into the first co-current contacting system 402A. The first co-current contacting system 402A may generate a first partially purified gas stream 406A, which may be flowed from the first co-current contacting system 402A to the second co-current contacting system 402B. The second co-current contacting system 402B may then generate a second partially purified gas stream 406B, which may be flowed from the second co-current contacting system 402B to the third co-current contacting system 402C. In some embodiments, the third co-current contacting system 402C generates a final purified gas stream 408.

Each of the first, second, and third co-current contacting systems 402A-C also generates a respective rich solvent stream 410A, 410B, and 410C. The third rich solvent stream 410C may be directed back to the second co-current contacting system 402B, and the second rich solvent stream 410B may be directed back to the first co-current contacting system 402A. In addition, the third co-current contacting system 402C may receive a lean (or semi-lean) solvent stream 410D from another source. Further, the first rich solvent stream 410A may be sent another separation system, e.g., another series of co-current contacting systems, for regeneration, as described with respect to FIGS. 2A, 2B-1, and 2B-2, or may serve as a liquid solvent for a preceding co-current contacting system (not shown).

Figure 4B:
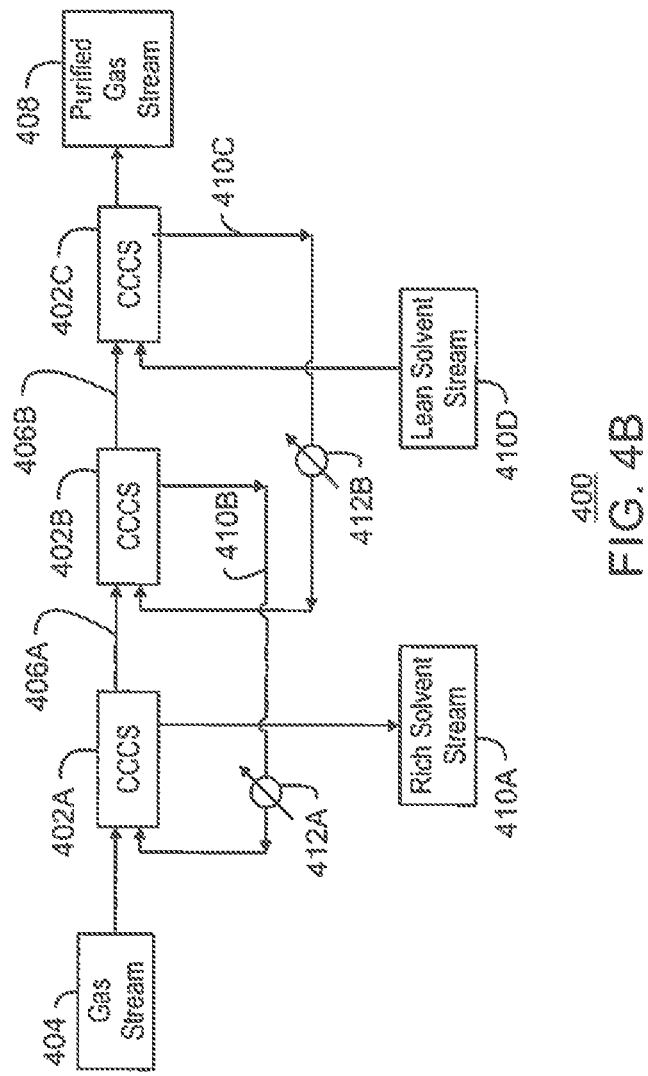
FIG. 4B is a process flow diagram of the separation system of FIG. 4A including the co-current contacting systems with the addition of a number of heat exchangers.

FIG. 4B is a process flow diagram of the separation system 400 of FIG. 4A including the co-current contacting systems 402A, 402B, and 402C with the addition of a number of heat exchangers 412A and 412B. The heat exchangers 412A and 412B may be used to cool the rich solvent streams 410B and 410C. In some embodiments, the heat exchangers 412A and 412B are used as an alternative to the use of the shell 403.

Figure 4C:
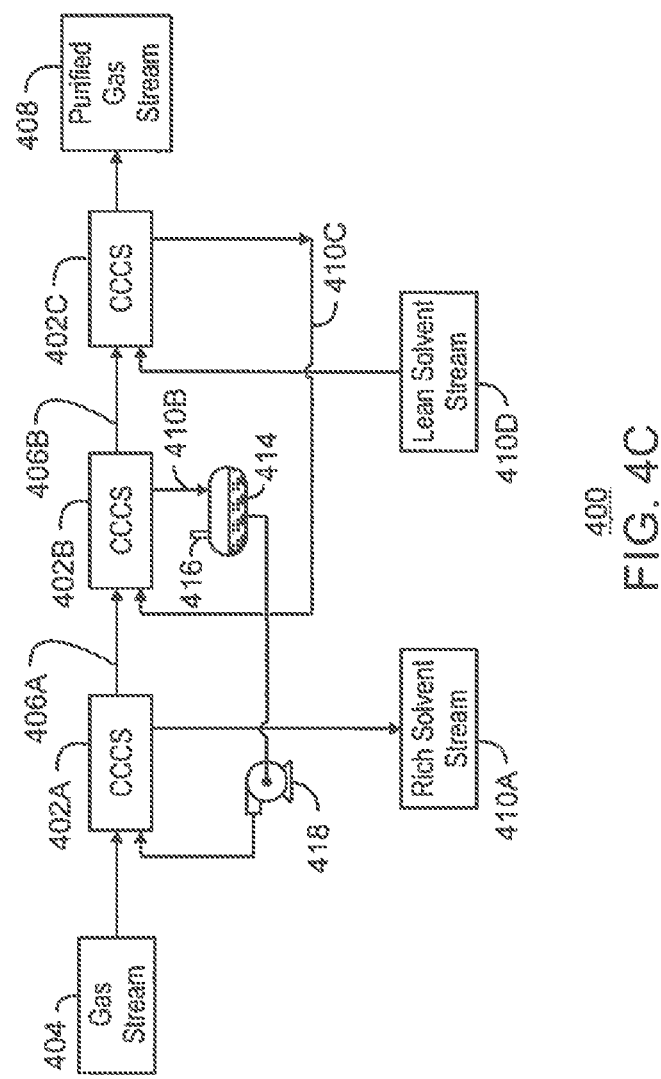
FIG. 4C is a process flow diagram of the separation system of FIG. 4A including the co-current contacting systems with the addition of one or more flash drums.

FIG. 4C is a process flow diagram of the separation system 400 of FIG. 4A including the co-current contacting systems 402A, 402B, and 402C with the addition of one or more flash drums 414. In the embodiment shown in FIG. 4C, the second rich solvent stream 410B may be flowed through the flash drum 414. A flash line 416 may be provided coming off the top of the flash drum 414. The flash drum 414 and associated flash line 416 may permit methane and any $CO_2$ absorbed in the second rich solvent stream 410B to be flashed out before the second rich solvent stream 410B is flowed into the first co-current contacting system 402A. $H_2O$ in vapor form may also be vented from the flash line 416. In various embodiments, flashing the second rich solvent stream 410B creates a semi-lean solvent stream. The use of a semi-lean solvent stream in the first co-current contacting system 402A may improve the efficiency of the first co-current contacting system 402A and reduce the load on the regenerator. Further, in some embodiments, any of the other solvent streams 410A, 410C, or 410D may also be flowed through a flash drum that is similar to the flash drum 414. In some embodiments, gas, e.g., methane, $CO_2$, and $H_2O$, flashing out of the flash line 416 is merged with gas flashing out of flash lines associated with any number of other flash drums within the gas processing system.

As shown in FIG. 4C, the second solvent stream 410B may also be flowed through a pump 418 after it exits the flash drum 414. The pump 418 may increase the pressure of the second solvent stream 410B, to treat the high pressure gas and to overcome the effect of the pressure drop that occurs within the co-current contacting systems 402A-C. Increasing the pressure of the second solvent stream 410B may also allow the second solvent stream 410B to more effectively entrain the acid gases within the gas stream 404.

It is to be understood that the separation system 400 is not limited to the number of co-current contacting systems shown in FIGS. 4A-C. Rather, the separation system 400 may include any suitable number of co-current contacting systems, depending on the details of the specific implementation. Further, the interconnections within the separation system 400 do not have to be arranged as shown in FIGS. 4A-C. Rather, any suitable variations or alternatives to the interconnections shown in FIGS. 4A-C may be present within the separation system 400, depending on the details of the specific implementation.

Figure 5:
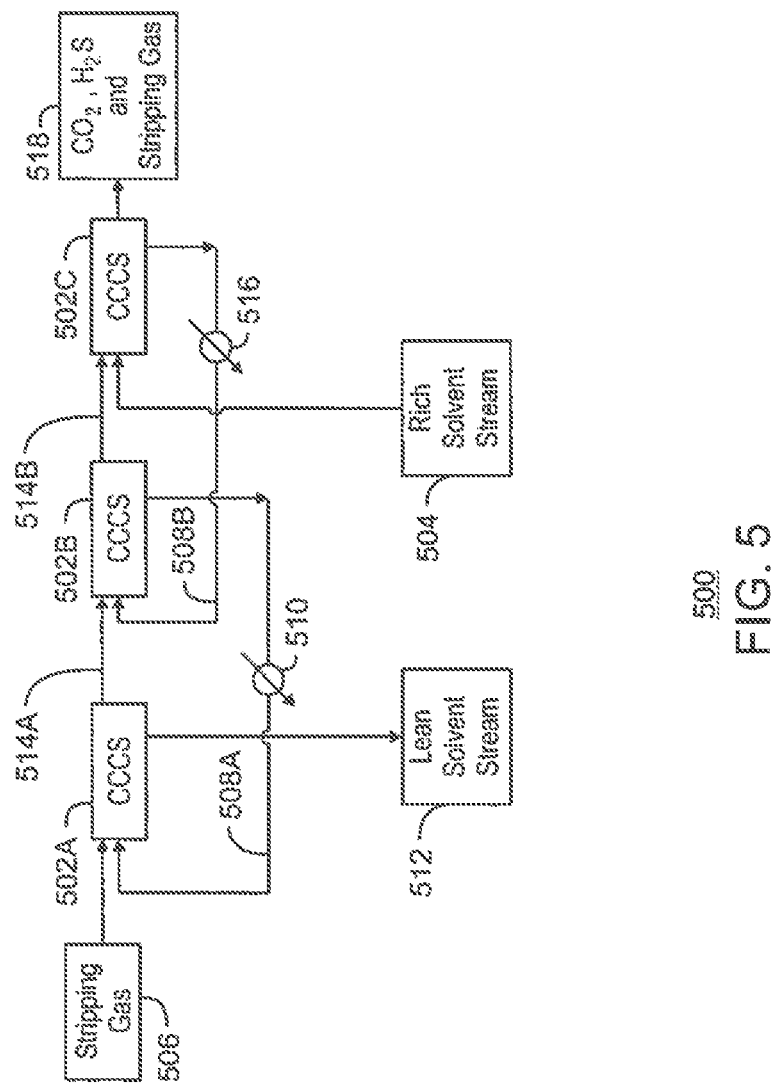
FIG. 5 is a process flow diagram of a gas regeneration system including a number of co-current contacting systems.

FIG. 5 is a process flow diagram of a gas regeneration system 500 including a number of co-current contacting systems 502A-C. The co-current contacting systems 502A-C may be used for the removal of $CO_2$ and $H_2S$ from a rich solvent stream 504. For example, in some embodiments, the gas regeneration system 500 may be implemented as the second series of co-current contacting systems 202B within the system 200 of FIG. 2A.

As shown in FIG. 5, a stripping gas 506 may be flowed into a first co-current contacting system 502A. The stripping gas 506 may be nitrogen, steam, or any other suitable type of stripping gas. If the stripping gas 506 is steam, the spent stream may be condensed, and the remaining vapor may be sent to a sulfur recovery unit or acid gas injection unit. In addition, the stripping gas 506 may be gas generated by boiling the liquid discharge from a third co-current contacting system 502C, analogous to using a reboiler in a regular separation column.

In addition, a first partially-unloaded, or "lean," solvent stream 508A may be heated within a first heat exchanger 510 and then flowed into the first co-current contacting system 502A. Once inside the first co-current contacting system 502A, the stripping gas 506 and the first partially-unloaded solvent stream 508A move along the longitudinal axis of the first co-current contacting system 502A. As they travel, the first partially-unloaded solvent stream 508A interacts with the stripping gas 506, causing any remaining $CO_2$ and $H_2S$ within the first partially-unloaded solvent stream 508A to chemically attach to or be absorbed by the amine molecules of the stripping gas 506. The resulting lean solvent stream 512 may then be flowed out of the gas regeneration facility 500. In some embodiments, the lean solvent stream 512 is flowed into another series of co-current contacting systems for the processing of a natural gas stream, as described with respect to the system 200 of FIGS. 2A, 2B-1, and 2B-2. Further, in some embodiments, a portion of the lean solvent stream 512 is boiled to generate the stripping gas 506.

A first gas mixture 514A including the stripping gas and a portion of the $CO_2$ and $H_2S$ may be flowed from the first co-current contacting system 502A to a second co-current contacting system 502B. In addition, a second partially-unloaded solvent stream 508B may be heated within a second heat exchanger 516 and then flowed into the second co-current contacting system 502B. Once inside the second co-current contacting system 502B, the first gas mixture 514A and the second partially-unloaded solvent stream 508B move along the longitudinal axis of the second co-current contacting system 502B. As they travel, the second partially-unloaded solvent stream 508B interacts with the first gas mixture 514A, causing a portion of the $CO_2$ and $H_2S$ within the second partially-unloaded solvent stream 508B to chemically attach to or be absorbed by the amine molecules within the first gas mixture 514A. The resulting first partially-unloaded solvent stream 508A may then be flowed from the second co-current contacting system 502B to the first co-current contacting system 502A.

A second gas mixture 514B including the stripping gas and a larger portion of the $CO_2$ and $H_2S$ may be flowed from the second co-current contacting system 502B to a third co-current contacting system 502C. In addition, the rich solvent stream 504 may be flowed into the third co-current contacting system 502C. In various embodiments, the rich solvent stream 504 may be warm due to the exothermic chemical reaction involved in an earlier $CO_2$ and $H_2S$ removal process, as well as possible pre-heating with an outside source.

Once inside the third co-current contacting system 502C, the second gas mixture 514B and the rich solvent stream 504 move along the longitudinal axis of the third co-current contacting system 502C. As they travel, the rich solvent stream 504 interacts with the second gas mixture 514B, causing a portion of the $CO_2$ and $H_2S$ within the rich solvent stream 504 to chemically attach to or be absorbed by the amine molecules within the second gas mixture 514B. The resulting second partially-unloaded solvent stream 508B may then be flowed from the third co-current contacting system 502C to the second co-current contacting system 502B. In addition, a gas stream 518 including the $CO_2$, $H_2S$, and stripping gas may be flowed out of the gas regeneration facility 500. In various embodiments, the $CO_2$ within the gas stream 518 may be recovered within another series of co-current contacting systems, and the $H_2S$ may be recovered within yet another series of co-current contacting systems, as described with respect to the system 200 of FIGS. 2A, 2B-1, and 2B-2.

It is to be understood that the gas regeneration system 500 is not limited to the number of co-current contacting systems shown in FIG. 5. Rather, the gas regeneration system 500 may include any suitable number of co-current contacting systems, depending on the details of the specific implementation. Further, the interconnections within the gas regeneration system 500 do not have to be arranged as shown in FIG. 5. Rather, any suitable variations or alternatives to the interconnections shown in FIG. 5 may be present within the gas regeneration system 500, depending on the details of the specific implementation.

Figure 6:
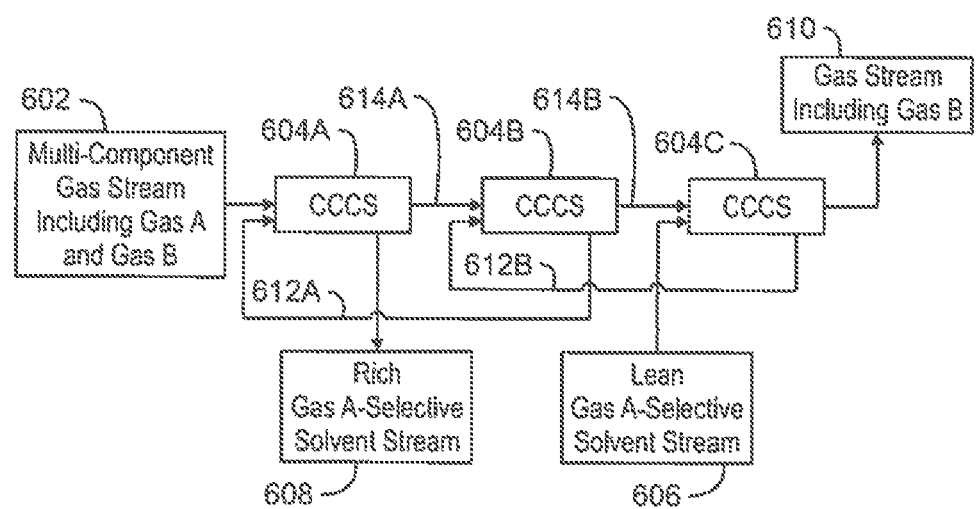
FIG. 6 is a process flow diagram of a separation system for preferentially removing one component from a multi-component gas stream.

FIG. 6 is a process flow diagram of a separation system 600 for preferentially removing one component from a multi-component gas stream. More specifically, the separation system 600 may be used to remove one gaseous component, referred to herein as "gas A," from a multi-component gas stream 602 including gas A and another gaseous component, referred to herein as "gas B." According to embodiments described herein, gas A may be $H_2S$, and gas B may be $CO_2$. However, it is to be understood that gas A and gas B may also be any other types of gas that are to be separated from one another via the separation system 600.

The separation system 600 may include a number of co-current contacting systems 604A-C connected in series. Each co-current contacting system 604A-C removes a portion of gas A from the multi-component gas stream 602 using a lean gas A-selective solvent stream 606 that preferentially absorbs gas A over gas B. This may result in the generation of a rich gas A-selective solvent stream 608 including gas A, as well as a separate gas stream 610 including primarily gas B.

In various embodiments, the multi-component gas stream 602 including gas A and gas B is flowed into the first co-current contacting system 604A. In addition, a first partially-loaded, or "rich," gas A-selective solvent stream 612A including some amount of gas A is flowed from the second co-current contacting system 604B into the first co-current contacting system 604A. Once inside the first co-current contacting system 604A, the multi-component gas stream 602 and the first partially-loaded gas A-selective solvent stream 612A move along the longitudinal axis of the first co-current contacting system 604A. As they travel, the first partially-loaded gas A-selective solvent stream 612A interacts with gas A within the multi-component gas stream 602, causing the molecules of gas A to chemically attach to or be absorbed by the molecules of the first partially-loaded gas A-selective solvent stream 612A. This may result in the generation of a first gas mixture 614A including gas B and some amount of gas A, as well as the rich gas A-selective solvent stream 608 including gas A. The rich gas A-selective solvent stream 608 may then be flowed out of the separation system 600.

In various embodiments, the first gas mixture 614A is flowed out of the first co-current contacting system 604A and into a second co-current contacting system 604B. In addition, a second partially-loaded gas A-selective solvent stream 612B is flowed from a third co-current contacting system 604C into the second co-current contacting system 604B. Once inside the second co-current contacting system 604B, the first gas mixture 614A and the second partially-loaded gas A-selective solvent stream 612B move along the longitudinal axis of the second co-current contacting system 604B. As they travel, the second partially-loaded gas A-selective solvent stream 612B interacts with gas A within the first gas mixture 614A, causing the molecules of gas A to chemically attach to or be absorbed by the molecules of the second partially-loaded gas A-selective solvent stream 612B. The resulting first partially-loaded gas A-selective solvent stream 612A may then be flowed from the second co-current contacting system 604B into the first co-current contacting system 604A. In addition, the resulting second gas mixture 614B, which includes a lower amount of gas A than the first gas mixture 614A, may be flowed out of the second co-current contacting system 604B and into the third co-current contacting system 604C.

In addition to the second gas mixture 614B, the lean gas A-selective solvent stream 606 may be flowed into the third co-current contacting system 604C from another source. The second gas mixture 614B and the lean gas A-selective solvent stream 606 may move along the longitudinal axis of the third co-current contacting system 604C. As they travel, the lean gas A-selective solvent stream 606 interacts with any remaining gas A within the second gas mixture 614B, causing the remaining molecules of gas A to chemically attach to or be absorbed by the molecules of the lean gas A-selective solvent stream 606. The resulting second partially-loaded gas A-selective solvent stream 612B may then be flowed from the third co-current contacting system 604C into the second co-current contacting system 604B. In addition, the resulting gas stream 610 that includes primarily gas B may be flowed out of the separation system 600.

In various embodiments, the gas A-selective solvent stream is a specially-designed solvent that preferentially absorbs gas A, i.e., species "A," over gas B, i.e., species "B." The rate of absorption ($R_A$) of A may be as shown below in Eq. (7).

$$R_A = K_{ogA} a \Delta P_{lmA} \quad (7)$$

In Eq. (7), $K_{ogA}$ is the overall mass transfer coefficient of A lumped on the gas side, $\alpha$ is the specific surface area, and $\Delta P_{lm}$ is the log mean driving force. The driving force is the difference in the partial pressure of A in the gas phase minus the equilibrium vapor pressure of A above the solvent. Similarly, the rate of absorption ($R_B$) of B may be as shown below in Eq. (8).

$$R_B = K_{ogB} a \Delta P_{lmB} \quad (8)$$

Therefore, the rate of absorption of B over A may be as shown below in Eq. (9).

$$\frac{R_A}{R_B} = \left(\frac{K_{ogA}}{K_{ogB}}\right)\left(\frac{\Delta P_{lmA}}{\Delta P_{lmB}}\right) \quad (9)$$

In some embodiments, altering the characteristics of the solvent stream may improve the ratio of $K_{ogA}$ to $K_{ogB}$. For example, the addition of solvent molecules that increase the rate of reaction of A and decrease the rate of reaction of B will likely improve the ratio. Alternatively, certain additives that interfere with the reaction of B with the solvent stream may be included within the solvent stream, thereby increasing the ratio of $K_{ogA}$ to $K_{ogB}$.

It is to be understood that the separation system 600 is not limited to the number of co-current contacting systems shown in FIG. 6. Rather, the separation system 600 may include any suitable number of co-current contacting systems, depending on the details of the specific implementation. Further, the interconnections within the separation system 600 do not have to be arranged as shown in FIG. 6. Rather, any suitable variations or alternatives to the interconnections shown in FIG. 6 may be present within the separation system 600, depending on the details of the specific implementation.

Co-Current Contacting System

Figure 7:
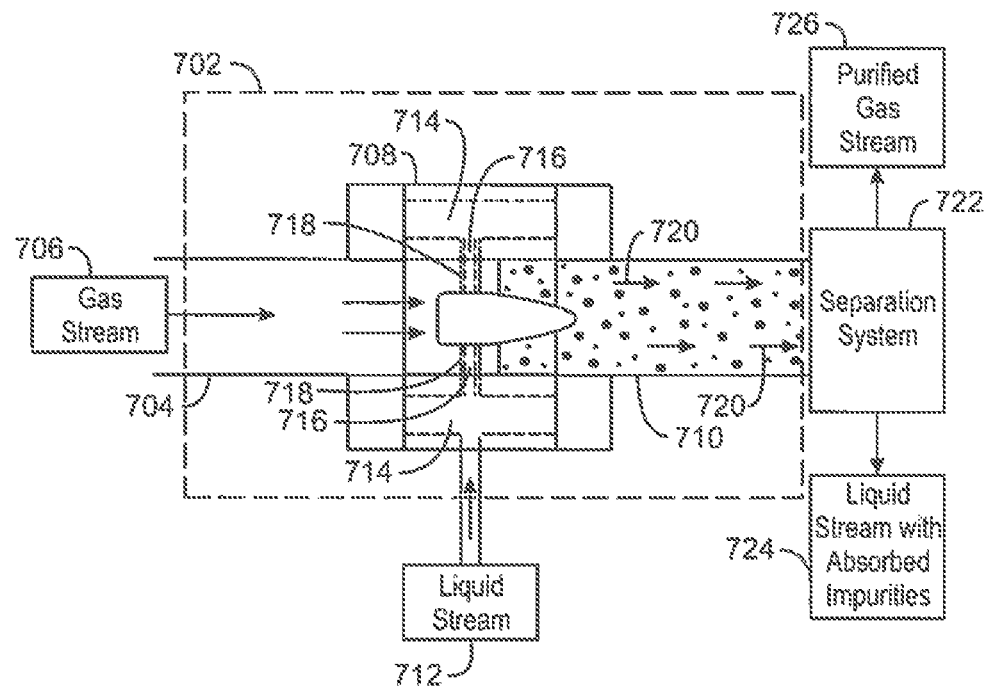
FIG. 7 is a schematic of a co-current contacting system.

FIG. 7 is a schematic of a co-current contacting system 700. The co-current contacting system 700 may provide for the separation of components within a gas stream. The co-current contacting system 700 may include a co-current contactor 702 that is positioned in-line within a pipe 704. The co-current contactor 702 may include a number of components that provide for the efficient contacting of a liquid droplet stream with a flowing gas stream 706. The liquid droplet stream can be used for the separation of impurities, such as $H_2O$, $H_2S$, or $CO_2$, from a gas stream 706.

In various embodiments, the co-current contactor 702 includes a mixer 708 and a mass transfer section 710. As shown in FIG. 7, the gas stream 706 may be flowed through the pipe 704 and into the mixer 708. A liquid stream 712 may also be flowed into the mixer 708, for example, through a hollow space 714 coupled to flow channels 716 in the mixer 708. The liquid stream 712 may include any type of treating liquid, e.g., solvent, that is capable of removing the impurities from the gas stream 706.

From the flow channels 716, the liquid stream 712 is released into the gas stream 706 as fine droplets through injection orifices 718, and is then flowed into the mass transfer section 710. This may result in the generation of a treated gas stream 720 within the mass transfer section 710. The treated gas stream 720 may include small liquid droplets dispersed in a gas phase. The liquid droplets may include impurities from the gas stream 706 that were adsorbed or dissolved into the liquid stream 712.

The treated gas stream 720 may be flowed from the mass transfer section 710 to a separation system 722, such as a cyclonic separator, a mesh screen, or a settling vessel. The separation system 722 removes the liquid droplets from the gas phase. The liquid droplets may include the original liquid stream with the incorporated impurities 724, and the gas phase may include a purified gas stream 726. In various embodiments, the purified gas stream 726 is a gas stream that has been purified via the removal of $H_2S$ and $CO_2$.

Figure 8A:
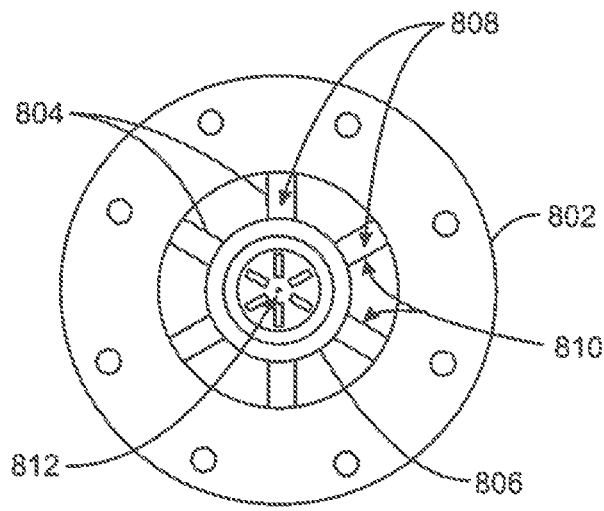
FIG. 8A is a front view of a mixer.
Figure 8B:
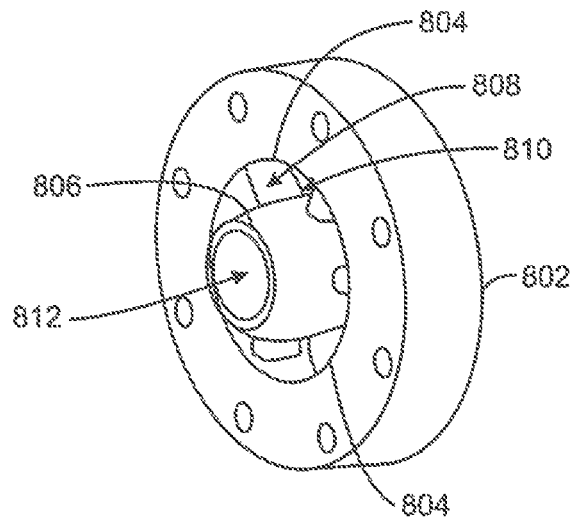
FIG. 8B is a side perspective view of the mixer.

FIG. 8A is a front view of a mixer 800. The mixer 800 is implemented within a co-current contactor, such as the co-current contactor 702 described with respect to the co-current contacting system 700 of FIG. 7. The mixer 800 may be an axial, in-line co-current contactor located within a pipe. The front view of the mixer 800 represents an upstream view of the mixer 800.

The mixer 800 may include an outer annular support ring 802, a number of radial blades 804 extending from the annular support ring 802, and a central gas entry cone 806. The annular support ring 802 may secure the mixer 800 in-line within the pipe. In addition, the radial blades 804 may provide support for the central gas entry cone 806.

Figure 8C:
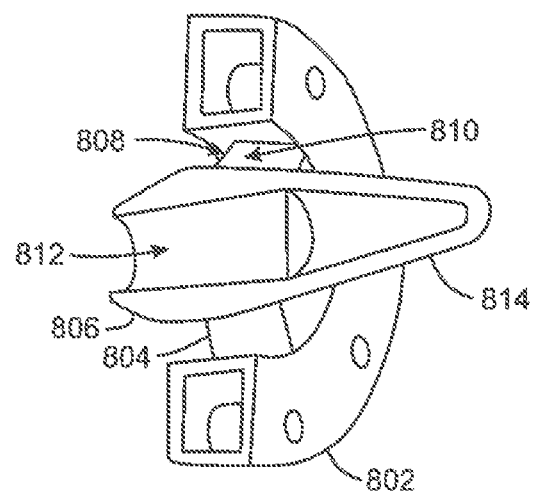
FIG. 8C is a cross-sectional side perspective view of the mixer.
Figure 8D:
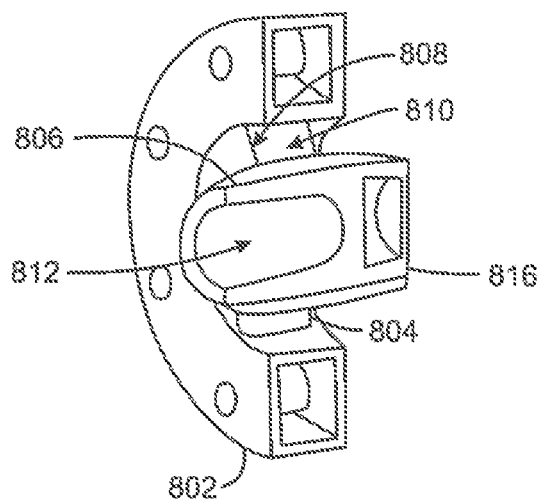
FIG. 8D is a another cross-sectional side perspective view of the mixer.

The annular support ring 802 may be designed as a flanged connection, or as a removable or fixed sleeve inside the pipe. In addition, the annular support ring 802 may include a liquid feed system and a hollow channel described further with respect to FIGS. 7, 8C and 8D. A liquid stream may be fed to the mixer 800 via the hollow channel in the annular support ring 802. The hollow channel may allow equal distribution of the liquid stream along the perimeter of the mixer 800.

Small liquid channels within the annular support ring 802 may provide a flow path for the liquid stream to flow through injection orifices 808 within the radial blades 804. The liquid injection orifices 808 may be located on or near the leading edge of each radial blade 804. Placement of the liquid injection orifices 808 on the radial blades 804 may allow the liquid stream to be uniformly distributed in a gas stream that is directed between the radial blades 804. Specifically, the liquid stream may be contacted by the gas stream flowing through the gaps between the radial blades 804, and may be sheared into small droplets and entrained in the gas phase.

The gas stream may also be flowed into the central gas entry cone 806 through a gas inlet 812. The central gas entry cone 806 may block a cross-sectional portion of the pipe. The radial blades 804 include gas exit slots 810 that allow the gas stream to be flowed out of the central gas entry cone 806. This may increase the velocity of the gas stream as it flows through the pipe. The central gas entry cone 806 may direct a predetermined amount of the gas stream to the gas exit slots 810 on the radial blades 804.

Some of the liquid stream injected through the radial blades 804 may be deposited on the surface of the radial blades 804 as a liquid film. As the gas stream flows through the central gas entry cone 806 and is directed out of the gas exit slots 810 on the radial blades 804, the gas stream may sweep, or blow, much of the liquid film off the radial blades 804. This may enhance the dispersion of the liquid stream into the gas phase. Further, the obstruction to the flow of the gas stream and the shear edges created by the central gas entry cone 806 may provide a zone with an increased turbulent dissipation rate. The may result in the generation of smaller droplets that enhance the mass transfer rate of the liquid stream and the gas stream.

The size of the mixer 800 may be adjusted such that the gas stream flows at a high velocity. This may be accomplished via either a sudden reduction in the diameter of the annular support ring 802 or a gradual reduction in the diameter of the annular support ring 802. The outer wall of the mixer 800 may be slightly converging in shape, terminating at the point where the gas stream and the liquid stream are discharged into the downstream pipe. This may allow for the shearing and re-entrainment of any liquid film that is removed from the mixer 800. Further, a radial inward ring, grooved surface, or other suitable equipment may be included on the outer diameter of the mixer 800 near the point where the gas stream and the liquid stream are discharged into the downstream pipe. This may enhance the degree of liquid entrainment within the gas phase.

The downstream end of the mixer 800 may discharge into a section of pipe (not shown). The section of pipe may be a straight section of pipe, or a concentric expansion section of pipe. In some embodiments, the central gas entry cone 806 terminates with a blunt ended cone or a tapered ended cone. In other embodiments, the central gas entry cone 806 terminates with a ridged cone, which may include multiple concentric ridges along the cone that provide multiple locations for droplet generation. In addition, any number of gas exit slots 810 may be provided on the cone itself to allow for the removal of the liquid film from the mixer 800.

FIG. 8B is a side perspective view of the mixer 800. Like numbered items are as described with respect to FIG. 8A. As shown in FIG. 8B, the upstream portion of the central gas entry cone 806 may extend further into the pipe than the annular support ring 802 and the radial blades 804 in the upstream direction. The downstream portion of the central gas entry cone 806 may also extend further into the pipe than the annular support ring 802 and the radial blades 804 in the downstream direction. The length of the central gas entry cone 806 in the downstream direction depends on the type of cone at the end of the central gas entry cone 806, as described further with respect to FIGS. 8C and 8D.

FIG. 8C is a cross-sectional side perspective view of the mixer 800. Like numbered items are as described with respect to FIGS. 8A and 8B. According to the embodiment shown in FIG. 8C, the central gas entry cone 806 of the mixer 800 terminates with a tapered ended cone 814. Terminating the central gas entry cone 806 with a tapered ended cone 814 may reduce the overall pressure drop in the pipe caused by the mixer 800.

FIG. 8D is another cross-sectional side perspective view of the mixer 800. Like numbered items are as described with respect to FIGS. 8A-C. According to the embodiment shown in FIG. 8D, the central gas entry cone 806 of the mixer 800 terminates with a blunt ended cone 816. Terminating the central gas entry cone 806 with a blunt ended cone 816 may encourage droplet formation in the center of the pipe.

Method for Separating $CO_2$ and $H_2S$ from a Natural Gas Stream

FIG. 9 is a process flow diagram of a method 900 for separating $CO_2$ and $H_2S$ from a natural gas stream. Specifically, the method 900 may provide for the removal of $CO_2$ and $H_2S$ from the natural gas stream, as well as the recovery of separate $CO_2$ and $H_2S$ streams. According to embodiments described herein, the method 900 is implemented by a number of co-current contacting systems. For example, the method 900 may be implemented by the series of co-current contacting systems 202A-D described with respect to the system 200 of FIGS. 2A, 2B-1, and 2B-2.

The method begins at block 902, at which a sour natural gas stream including $CO_2$ and $H_2S$ is contacted with a lean solvent stream within a first series of co-current contacting systems, resulting in the generation of a sweetened natural gas stream and a rich solvent stream including the $CO_2$ and the $H_2S$. More specifically, the sour natural gas stream is progressively sweetened via contact with the solvent stream within each of a number of co-current contacting systems connected in series. In some embodiments, the resulting sweetened natural gas stream is used to produce LNG.

At block 904, the rich solvent stream is contacted with a stripping gas within a second series of co-current contacting systems, resulting in the regeneration of the lean solvent stream and the generation of a first gas stream including the $CO_2$, the $H_2S$, and the stripping gas. More specifically, the $CO_2$ and the $H_2S$ are progressively removed from the rich solvent stream via contact with the stripping gas within each of a number of co-current contacting systems connected in series. Further, at block 906, the lean solvent stream is recirculated to the first series of co-current contacting systems.

At block 908, the first gas stream is contacted with a lean $H_2S$-selective solvent stream within a third series of co-current contacting systems, resulting in the generation of a rich $H_2S$-selective solvent stream including the $H_2S$ and a second gas stream including the $CO_2$ and the stripping gas.

More specifically, the $H_2S$ is progressively removed from the first gas stream via contact with the $H_2S$-selective solvent stream within each of a number of co-current contacting systems connected in series. In various embodiments, the $CO_2$ is removed from the second gas stream to recover a final $CO_2$ product. The resulting stripping gas may then be recirculated to the second series of co-current contacting systems. In addition, in some embodiments, the final $CO_2$ product is injected into a subterranean reservoir for enhanced oil recovery (EOR) operations.

At block 910, the rich $H_2S$-selective solvent stream is contacted with a stripping gas within a fourth series of co-current contacting systems, resulting in the regeneration of the lean $H_2S$-selective solvent stream and the generation of a third gas stream including the $H_2S$ and the stripping gas. More specifically, the $H_2S$ is progressively removed from the rich $H_2S$-selective solvent stream via contact with the stripping gas within each of a number of co-current contacting systems connected in series. In various embodiments, the $H_2S$ is removed from the third gas stream to recover a final $H_2S$ product. The resulting stripping gas may then be recirculated to the fourth series of co-current contacting systems. In addition, in some embodiments, elemental sulfur is recovered from the final $H_2S$ product within a Claus sulfur recovery unit. Furthermore, at block 912, the lean $H_2S$-selective solvent stream is recirculated to the third series of co-current contacting systems.

Figure 9:
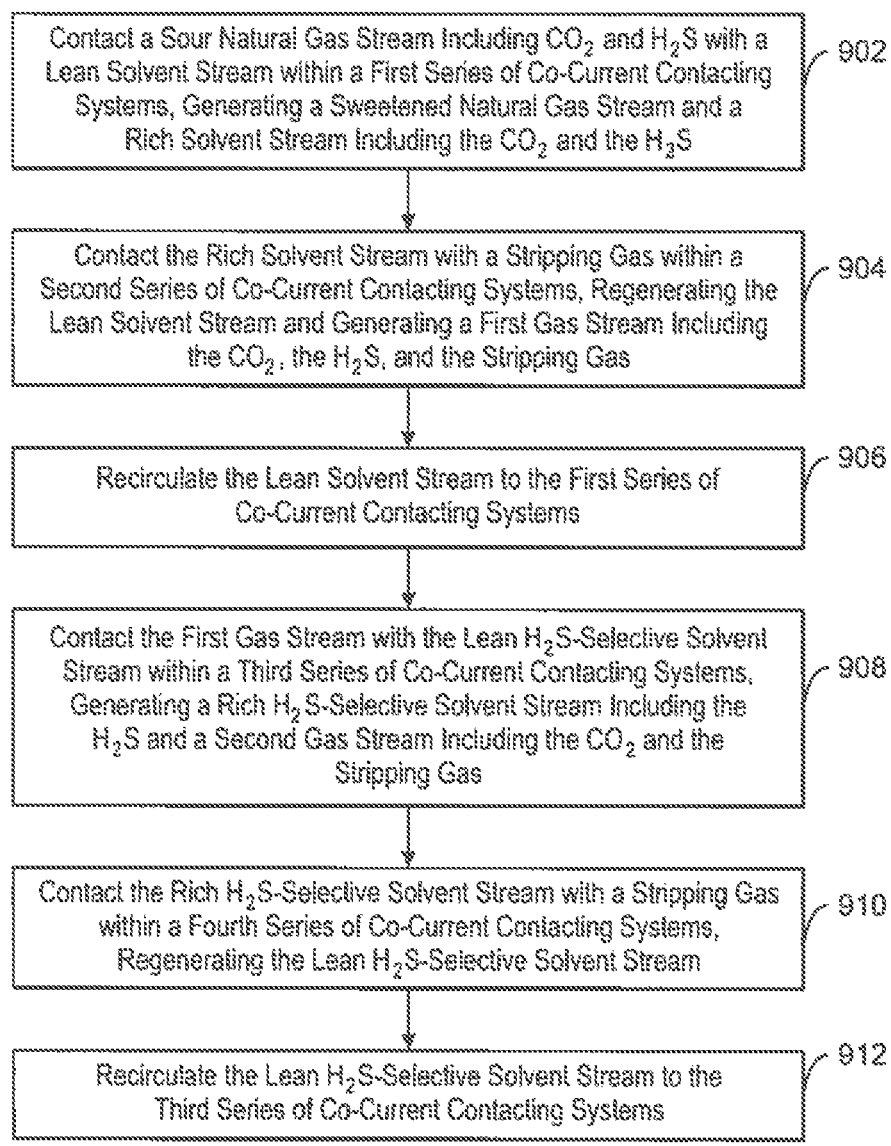
FIG. 9 is a process flow diagram of a method for separating $CO_2$ and $H_2S$ from a natural gas stream.

The process flow diagram of FIG. 9 is not intended to indicate that the blocks of the method 900 are to be executed in any particular order, or that all of the blocks of the method 900 are to be included in every case. Further, any number of additional blocks not shown in FIG. 9 may be included within the method 900, depending on the details of the specific implementation.

Figure 10:
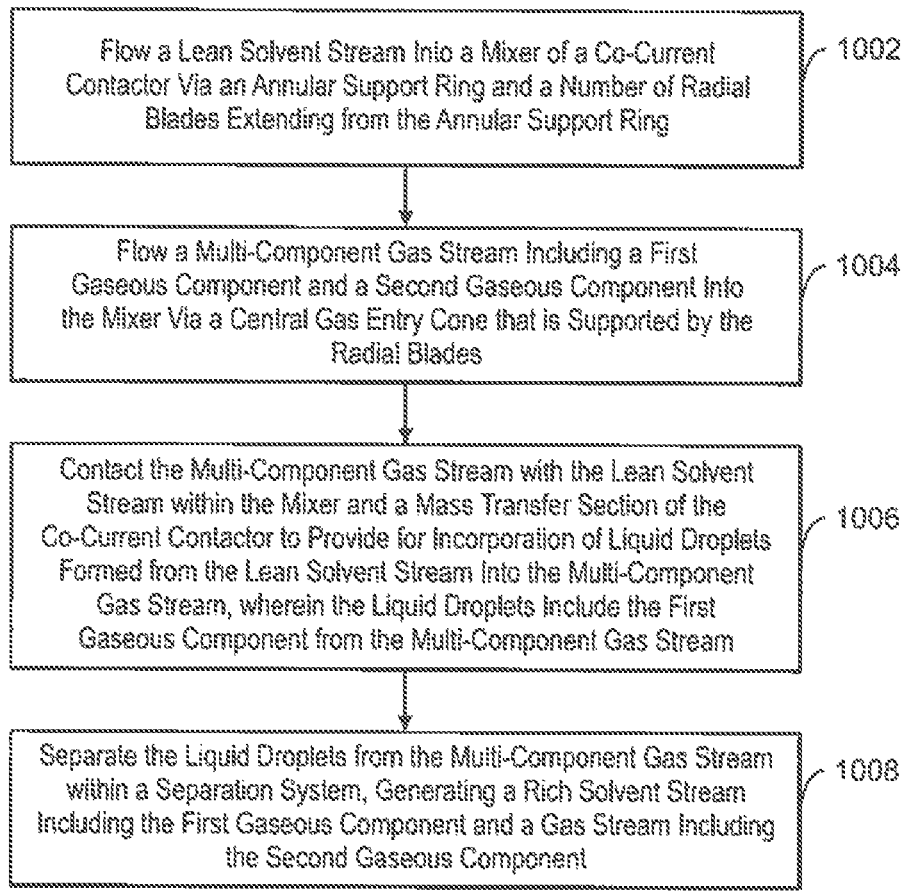
FIG. 10 is a process flow diagram of a method for selectively removing one gaseous component from a multi-component gas stream.

Method for Selectively Removing One Gaseous Component from a Multi-Component Gas Stream FIG. 10 is a process flow diagram of a method 1000 for selectively removing one gaseous component from a multi-component gas stream. According to embodiments described herein, the method 1000 is implemented by a number of co-current contacting systems connected in series. For example, the method 1000 may be implemented by the co-current contacting systems 604A-C described with respect to the separation system 600 of FIG. 6.

The method begins at block 1002, at which a lean solvent stream is flowed into a mixer of a co-current contactor via an annular support ring and a number of radial blades extending from the annular support ring. The annular support ring secures the mixer in-line within a pipe.

At block 1004, a multi-component gas stream including a first gaseous component and a second gaseous component is flowed into the mixer via a central gas entry cone that is supported by the radial blades. More specifically, a first portion of the multi-component gas stream flows through the central gas entry cone, and a second portion of the multi-component gas stream flows around the central gas entry cone between the radial blades. In some embodiments, the first gaseous component is $H_2S$, the second gaseous component is $CO_2$, and the solvent stream is an $H_2S$-selective solvent stream. For example, the solvent stream may be a tertiary amine.

At block 1006, the multi-component gas stream is contacted with the lean solvent stream within the mixer and a mass transfer section of the co-current contactor to provide for incorporation of liquid droplets formed from the lean solvent stream into the multi-component gas stream. According to embodiments described herein, the solvent stream is a specially-designed solvent that preferentially absorbs the first gaseous component over the second gaseous component. Therefore, the liquid droplets include the first gaseous component from the multi-component gas stream.

At block 1008, the liquid droplets are separated from the multi-component gas stream within a separation system, resulting in the generation of a rich solvent stream including the first gaseous component and a gas stream including the second gaseous component. Accordingly, the method 1000 provides for the selective removal of the first gaseous component from the multi-component gas stream using the specially-designed solvent.

The process flow diagram of FIG. 10 is not intended to indicate that the blocks of the method 1000 are to be executed in any particular order, or that all of the blocks of the method 1000 are to be included in every case. Further, any number of additional blocks not shown in FIG. 10 may be included within the method 1000, depending on the details of the specific implementation. For example, in some embodiments, the multi-component gas stream is flowed through a number of co-current contactors and corresponding separation systems connected in series within the pipe. In such embodiments, the first gaseous component is progressively removed from the multi-component gas stream within each co-current contactor and corresponding separation system. Further, in some embodiments, the lean solvent stream is regenerated from the rich solvent stream within a separate co-current contactor and corresponding separation system, or separate series of co-current contactors and corresponding separation systems connected in series within the pipe.

Embodiments

Embodiments of the invention may include any combinations of the methods and systems shown in the following numbered paragraphs. This is not to be considered a complete listing of all possible embodiments, as any number of variations can be envisioned from the description above.

1. A system for separating $H_2S$ and $CO_2$ from a natural gas stream, including:
   a first loop of co-current contacting systems configured to remove $H_2S$ and $CO_2$ from a natural gas stream; and
   a second loop of co-current contacting systems configured to remove the $H_2S$ from the $CO_2$.

2. The system of paragraph 1, wherein the first loop of co-current contacting systems includes:
   a first series of co-current contacting systems configured to remove the $H_2S$ and the $CO_2$ from the natural gas stream by contacting the natural gas stream with a solvent stream, providing for incorporation of the $H_2S$ and the $CO_2$ from the natural gas stream into the solvent stream;
   a second series of co-current contacting systems configured to remove the $H_2S$ and the $CO_2$ from the solvent stream, wherein the solvent stream is recirculated to the first series of co-current contacting systems.

3. The system of paragraph 2, wherein the second loop of co-current contacting systems includes:
   a third series of co-current contacting systems configured to remove the $H_2S$ from the $CO_2$ by contacting the $H_2S$ and the $CO_2$ with an $H_2S$-selective solvent stream, providing for incorporation of the $H_2S$ into the $H_2S$-selective solvent stream; and
   a fourth series of co-current contacting systems configured to remove the $H_2S$ from the $H_2S$-selective solvent stream, wherein the $H_2S$-selective solvent stream is recirculated to the third series of co-current contacting systems.

4. A method for separating $CO_2$ and $H_2S$ from a natural gas stream, including:
  contacting a sour natural gas stream including $CO_2$ and $H_2S$ with a lean solvent stream within a first series of co-current contacting systems, generating a sweetened natural gas stream and a rich solvent stream including the $CO_2$ and the $H_2S$;
  contacting the rich solvent stream with a stripping gas within a second series of co-current contacting systems, regenerating the lean solvent stream and generating a first gas stream including the $CO_2$, the $H_2S$, and the stripping gas;
  recirculating the lean solvent stream to the first series of co-current contacting systems;
  contacting the first gas stream with a lean $H_2S$-selective solvent stream within a third series of co-current contacting systems, generating a rich $H_2S$-selective solvent stream including the $H_2S$ and a second gas stream including the $CO_2$ and the stripping gas;
  contacting the rich $H_2S$-selective solvent stream with a stripping gas within a fourth series of co-current contacting systems, regenerating the lean $H_2S$-selective solvent stream and generating a third gas stream including the $H_2S$ and the stripping gas; and
  recirculating the lean $H_2S$-selective solvent stream to the third series of co-current contacting systems.

5. The method of paragraph 4, including producing liquefied natural gas (LNG) from the sweetened natural gas stream.

6. The method of any of paragraphs 4 and 5, including removing the $CO_2$ from the second gas stream to recover a final $CO_2$ product.

7. The method of paragraph 6, including recirculating the stripping gas from the second gas stream to the second series of co-current contacting systems.

8. The method of any of paragraphs 6 and 7, including injecting the final $CO_2$ product into a subterranean reservoir for enhanced oil recovery (EOR) operations.

9. The method of any of paragraphs 4-6, including removing the $H_2S$ from the third gas stream to recover a final $H_2S$ product.

10. The method of paragraph 9, including recirculating the stripping gas from the third gas stream to the fourth series of co-current contacting systems.

11. The method of any of paragraphs 9 and 10, including recovering elemental sulfur from the final $H_2S$ product within a Claus sulfur recovery unit.

12. The method of any of paragraphs 4-6 and 9, wherein contacting the sour natural gas stream with the lean solvent stream within a first series of co-current contacting systems includes progressively sweetening the sour natural gas stream via contact with the lean solvent stream within each of a number of co-current contacting systems connected in series.

13. The method of any of paragraphs 4-6, 9, and 12, wherein contacting the rich solvent stream with the stripping gas within the second series of co-current contacting systems includes progressively removing the $CO_2$ and the $H_2S$ from the rich solvent stream via contact with the stripping gas within each of a number of co-current contacting systems connected in series.

14. The method of any of paragraphs 4-6, 9, 12, and 13, wherein contacting the first gas stream with the lean $H_2S$-selective solvent stream within the third series of co-current contacting systems includes progressively removing the $H_2S$ from the first gas stream via contact with the lean $H_2S$-selective solvent stream within each of a number of co-current contacting systems connected in series.

15. The method of any of paragraphs 4-6, 9, and 12-14, wherein contacting the rich $H_2S$-selective solvent stream with the stripping gas within the fourth series of co-current contacting systems includes progressively removing the $H_2S$ from the rich $H_2S$-selective solvent stream via contact with the stripping gas within each of a number of co-current contacting systems connected in series.

16. A system for separating $CO_2$ and $H_2S$ from a natural gas stream, including:
  a first series of co-current contacting systems configured to contact a sour natural gas stream including $CO_2$ and $H_2S$ with a lean solvent stream to generate a sweetened natural gas stream and a rich solvent stream including the $CO_2$ and the $H_2S$;
  a second series of co-current contacting systems configured to contact the rich solvent stream with a stripping gas to regenerate the lean solvent stream and generate a first gas stream including the $CO_2$, the $H_2S$, and the stripping gas, wherein the lean solvent stream is recirculated to the first series of co-current contacting systems;
  a third series of co-current contacting systems configured to contact the first gas stream with a lean $H_2S$-selective solvent stream to generate a rich $H_2S$-selective solvent stream including the $H_2S$ and a second gas stream including the $CO_2$ and the stripping gas; and
  a fourth series of co-current contacting systems configured to contact the rich $H_2S$-selective solvent stream with a stripping gas to regenerate the lean $H_2S$-selective solvent stream and generate a third gas stream including the $H_2S$ and the stripping gas, wherein the lean $H_2S$-selective solvent stream is recirculated to the third series of co-current contacting systems.

17. The system of paragraph 16, wherein each of the first series of co-current contacting systems, the second series of co-current contacting systems, the third series of co-current contacting systems, and the fourth series of co-current contacting systems includes a number of co-current contacting systems connected in series.

18. The system of paragraph 17, wherein each of the number of co-current contacting systems includes:
  a co-current contactor located in-line within a pipe, the co-current contactor including:
    a mixer, including:
      an annular support ring configured to maintain the mixer within the pipe;
      a number of radial blades configured to allow a liquid stream to flow into the mixer; and
      a central gas entry cone configured to allow a gas stream to flow through a hollow section within the mixer; and
    a mass transfer section downstream of the mixer;
    wherein the mixer and the mass transfer section provide for efficient incorporation of liquid droplets formed from the liquid stream into the gas stream; and
  a separation system configured to remove the liquid droplets from the gas stream.

19. The system of paragraph 18, wherein the separation system includes a cyclonic separator.

20. The system of any of paragraphs 18 and 19, wherein a downstream portion of the central gas entry cone includes a blunt ended cone.

21. The system of any of paragraphs 18-20, wherein a downstream portion of the central gas entry cone includes a tapered ended cone.

22. The system of any of paragraphs 16 and 17, wherein the $H_2S$-selective solvent stream includes a tertiary amine.

23. The system of any of paragraphs 16, 17, and 22, wherein the $H_2S$-selective solvent stream includes a sterically-hindered amine.

24. The system of any of paragraphs 16, 17, 22, and 23, wherein the stripping gas includes nitrogen.

25. The system of any of paragraphs 16, 17, and 22-24, wherein the system includes a $CO_2$ separation system configured to remove the $CO_2$ from the second gas stream to recover a final $CO_2$ product.

26. The system of paragraph 25, wherein the stripping gas from the second gas stream is recirculated to the second series of co-current contacting systems.

27. The system of any of paragraphs 16, 17, and 22-25, wherein the system includes a $H_2S$ separation system configured to remove the $H_2S$ from the third gas stream to recover a final $H_2S$ product.

28. The system of paragraph 27, wherein the stripping gas from the third gas stream is recirculated to the fourth series of co-current contacting systems.

29. A method for selectively removing one gaseous component from a multi-component gas stream, including:
flowing a lean solvent stream into a mixer of a co-current contactor via an annular support ring and a number of radial blades extending from the annular support ring, wherein the annular support ring secures the mixer in-line within a pipe;
flowing a multi-component gas stream including a first gaseous component and a second gaseous component into the mixer via a central gas entry cone that is supported by the number of radial blades, wherein a first portion of the multi-component gas stream flows through the central gas entry cone and a second portion of the multi-component gas stream flows around the central gas entry cone between the number of radial blades;
contacting the multi-component gas stream with the lean solvent stream within the mixer and a mass transfer section of the co-current contactor to provide for incorporation of liquid droplets formed from the lean solvent stream into the multi-component gas stream, wherein the liquid droplets include the first gaseous component from the multi-component gas stream; and
separating the liquid droplets from the multi-component gas stream within a separation system, generating a rich solvent stream including the first gaseous component and a gas stream including the second gaseous component.

30. The method of paragraph 29, wherein the first gaseous component includes $H_2S$, the second gaseous component includes $CO_2$, and the solvent stream includes an $H_2S$-selective solvent stream.

31. The method of paragraph 30, wherein the $H_2S$-selective solvent stream includes a tertiary amine.

32. The method of any of paragraphs 30 and 31, wherein the $H_2S$-selective solvent stream includes a sterically-hindered amine.

33. The method of any of paragraphs 29 and 30, including flowing the multi-component gas stream through a number of co-current contactors and corresponding separation systems connected in series within the pipe.

34. The method of any of paragraphs 29, 30, and 33, including regenerating the lean solvent stream from the rich solvent stream within a separate co-current contactor and corresponding separation system.

While the present techniques may be susceptible to various modifications and alternative forms, the embodiments described above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A system for separating $H_2S$ and $CO_2$ from a natural gas stream, comprising:
a first loop of co-current contacting systems configured to remove $H_2S$ and $CO_2$ from a natural gas stream, the first loop of co-current contacting systems including
a first series of co-current contacting systems configured to remove the $H_2S$ and the $CO_2$ from the natural gas stream by contacting the natural gas stream with a solvent stream, providing for incorporation of the $H_2S$ and the $CO_2$ from the natural gas stream into the solvent stream, and;
a second series of co-current contacting systems configured to remove the $H_2S$ and the $CO_2$ from the solvent stream, wherein the solvent stream is recirculated to the first series of co-current contacting systems; and
a second loop of co-current contacting systems configured to remove the $H_2S$ from the $CO_2$, the second loop of co-current contacting systems including
a third series of co-current contacting systems configured to remove the $H_2S$ from the $CO_2$ by contacting the $H_2S$ and the $CO_2$ with an $H_2S$-selective solvent stream, providing for incorporation of the $H_2S$ into the $H_2S$-selective solvent stream, and
a fourth series of co-current contacting systems configured to remove the $H_2S$ from the $H_2S$-selective solvent stream, wherein the $H_2S$-selective solvent stream is recirculated to the third series of co-current contacting systems;
wherein each of the co-current contacting systems includes
a co-current contactor located in-line within a pipe, the co-current contactor including
a mixer, including
an annular support ring configured to maintain the mixer within the pipe,
a number of radial blades extending from the annular support ring and configured to allow a liquid stream to flow into the mixer, and
a central gas entry cone supported by the number of radial blades and configured to allow a gas stream to flow through a hollow section within the mixer, and
a mass transfer section downstream of the mixer, wherein the mixer and the mass transfer section provide for efficient incorporation of liquid droplets formed from the liquid stream into the gas stream; and
a separation system configured to remove the liquid droplets from the gas stream.

2. The system of claim 1, further comprising:
a hollow channel in the annular support ring and the plurality of radial blades, the hollow channel being configured to permit the liquid stream to be flowed therethrough into the mixer; and injection orifices disposed on the plurality of radial blades, the injection orifices being configured to thereby inject the liquid stream into the gas stream.

3. The system of claim 1, further comprising gas exit slots included in the plurality of radial blades, wherein a first portion of the gas stream flows through a hollow section in the central gas entry cone and through the gas exit slots.

4. A system for separating $CO_2$ and $H_2S$ from a natural gas stream, comprising:
  a first series of co-current contacting systems configured to contact a sour natural gas stream comprising $CO_2$ and $H_2S$ with a lean solvent stream to generate a sweetened natural gas stream and a rich solvent stream comprising the $CO_2$ and the $H_2S$;
  a second series of co-current contacting systems configured to contact the rich solvent stream with a stripping gas to regenerate the lean solvent stream and generate a first gas stream comprising the $CO_2$, the $H_2S$, and the stripping gas, wherein the lean solvent stream is recirculated to the first series of co-current contacting systems;
  a third series of co-current contacting systems configured to contact the first gas stream with a lean $H_2S$-selective solvent stream to generate a rich $H_2S$-selective solvent stream comprising the $H_2S$ and a second gas stream comprising the $CO_2$ and the stripping gas; and
  a fourth series of co-current contacting systems configured to contact the rich $H_2S$-selective solvent stream with a stripping gas to regenerate the lean $H_2S$-selective solvent stream and generate a third gas stream comprising the $H_2S$ and the stripping gas, wherein the lean $H_2S$-selective solvent stream is recirculated to the third series of co-current contacting systems;
  wherein each of the first series of co-current contacting systems, the second series of co-current contacting systems, the third series of co-current contacting systems, and the fourth series of co-current contacting systems includes a number of co-current contacting systems connected in series; and
  wherein each of the number of co-current contacting systems includes:
    a co-current contactor located in-line within a pipe, the co-current contactor including:
      a mixer, including:
        an annular support ring configured to maintain the mixer within the pipe;
        a number of radial blades extending from the annular support ring and configured to allow a liquid stream to flow into the mixer; and
        a central gas entry cone supported by a number of radial blades and configured to allow a gas stream to flow through a hollow section within the mixer; and
      a mass transfer section downstream of the mixer;
      wherein the mixer and the mass transfer section provide for efficient incorporation of liquid droplets formed from the liquid stream into the gas stream; and
    a separation system configured to remove the liquid droplets from the gas stream.

5. The system of claim 4, wherein the separation system comprises a cyclonic separator.

6. The system of claim 4, wherein a downstream portion of the central gas entry cone comprises a blunt ended cone.

7. The system of claim 4, wherein a downstream portion of the central gas entry cone comprises a tapered ended cone.

8. The system of claim 4, wherein the $H_2S$-selective solvent stream comprises a tertiary amine.

9. The system of claim 4, wherein the $H_2S$-selective solvent stream comprises a sterically-hindered amine.

10. The system of claim 4, wherein the stripping gas comprises nitrogen.

11. The system of claim 4, wherein the system comprises a $CO_2$ separation system configured to remove the $CO_2$ from the second gas stream to recover a final $CO_2$ product.

12. The system of claim 11, wherein the stripping gas from the second gas stream is recirculated to the second series of co-current contacting systems.

13. The system of claim 4, wherein the system comprises a $H_2S$ separation system configured to remove the $H_2S$ from the third gas stream to recover a final $H_2S$ product.

14. The system of claim 13, wherein the stripping gas from the third gas stream is recirculated to the fourth series of co-current contacting systems.

15. The method of claim 4, wherein the liquid stream is flowed into the co-current contactor via a hollow channel in the annular support ring and the plurality of radial blades, and further comprising:
  injecting the liquid stream into the gas stream via injection orifices disposed on the plurality of radial blades.

16. The method of claim 4, wherein a first portion of the gas stream flows through a hollow section in the central gas entry cone and through gas exit slots included in the plurality of radial blades.

* * * * *